United States Patent
Otsuki et al.

(10) Patent No.: US 8,914,714 B2
(45) Date of Patent: Dec. 16, 2014

(54) WIRELESS COMMUNICATION SYSTEM, WIRELESS RELAY STATION APPARATUS, WIRELESS TERMINAL STATION APPARATUS, AND WIRELESS COMMUNICATION METHOD

(75) Inventors: Nobuaki Otsuki, Yokosuka (JP); Yusuke Asai, Yokosuka (JP); Takatoshi Sugiyama, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 332 days.

(21) Appl. No.: 13/498,968

(22) PCT Filed: Sep. 29, 2010

(86) PCT No.: PCT/JP2010/066899
§ 371 (c)(1),
(2), (4) Date: Jun. 1, 2012

(87) PCT Pub. No.: WO2011/043230
PCT Pub. Date: Apr. 14, 2011

(65) Prior Publication Data
US 2012/0239997 A1  Sep. 20, 2012

(30) Foreign Application Priority Data
Oct. 7, 2009  (JP) .................. 2009-233740

(51) Int. Cl.
*H03M 13/00* (2006.01)
*H04L 1/00* (2006.01)
*H04B 7/155* (2006.01)

(52) U.S. Cl.
CPC .......... *H04B 7/15521* (2013.01); *H04L 1/0076* (2013.01); *H04L 2001/0097* (2013.01); *H04L 1/0009* (2013.01)
USPC ......................................... 714/779; 714/774

(58) Field of Classification Search
CPC ............................ H04L 1/0076; H04L 1/0091
USPC ....................................... 714/779, 774
See application file for complete search history.

(56) References Cited

U.S. PATENT DOCUMENTS 7,904,293 B2 * 3/2011 Wang et al. .................. 704/222
8,255,753 B2 * 8/2012 Xue et al. ...................... 714/748
(Continued)

FOREIGN PATENT DOCUMENTS

JP  2008-028656 A  2/2008
JP  2009-135928 A  6/2009
(Continued)

OTHER PUBLICATIONS

Decision of Rejection, Japanese Patent Application No. 2011-535356, Mar. 5, 2013.
(Continued)

*Primary Examiner* — M. Mujtaba K Chaudry
(74) *Attorney, Agent, or Firm* — Harness, Dickey & Pierce, P.L.C.

(57) ABSTRACT

Provided is a wireless communication system employing network coding which can set transmission quality for each destination of packets and improve throughput. The wireless communication system is provided with a wireless relay station apparatus and wireless terminal station apparatuses. The wireless relay station apparatus selects coding rates to be used for a first packet and a second packet in accordance with communication quality required for the first packet and the second packet, generates error correction encoded packets having the same data length from the first packet and the second packet using the selected coding rates, performs network encoding on the error correction encoded first and second packets to generate a network encoded packet, and transmits the generated network encoded packet. The wireless terminal station apparatus performs error correction encoding on a third packet equal to one of the first and second packets, performs network decoding on a received network encoded packet using the error correction encoded third packet to generate a decoded packet, and performs error correction decoding.

16 Claims, 12 Drawing Sheets

(56) References Cited

U.S. PATENT DOCUMENTS

| | | |
|---|---|---|
| 2007/0184826 A1 | 8/2007 | Park et al. |
| 2009/0109999 A1 | 4/2009 | Kuri et al. |
| 2009/0232043 A1 | 9/2009 | Wu et al. |
| 2009/0268660 A1* | 10/2009 | Agarwal ............... 370/316 |
| 2009/0268790 A1* | 10/2009 | Josiam et al. ............ 375/211 |
| 2010/0246708 A1 | 9/2010 | Horiuchi et al. |

FOREIGN PATENT DOCUMENTS

| | | |
|---|---|---|
| JP | 2009-225063 A | 10/2009 |
| WO | 2007/020996 A1 | 2/2007 |
| WO | 2007/102363 A1 | 9/2007 |
| WO | 2009/066451 A1 | 5/2009 |
| WO | 2009/069262 A1 | 6/2009 |

OTHER PUBLICATIONS

Sachin Katti, Hariharan Rahul, et al., "XORs in the Air: Practical Wireless Network Coding," Proc. ACM SIGCOMM 2006, Pisa, Italy, Sep. 2006, pp. 243-254.

R. Ahlswede, N. Cai, S. Li, and R. Yeung, "Network Information Flow," IEEE Trans. Inf. Theory, vol. 46, No. 4, pp. 1204-1216, Jul. 2000.

International Search Report for PCT/JP2010/066899, ISA/JP, mailed Dec. 7, 2010.

* cited by examiner

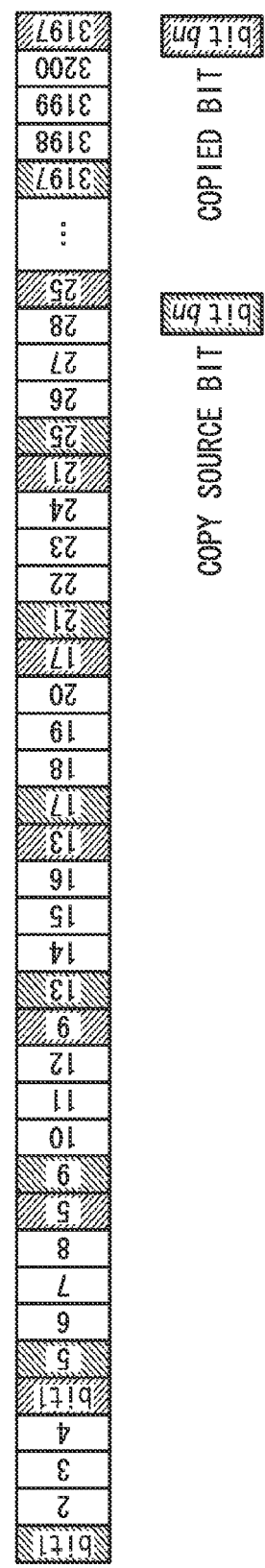

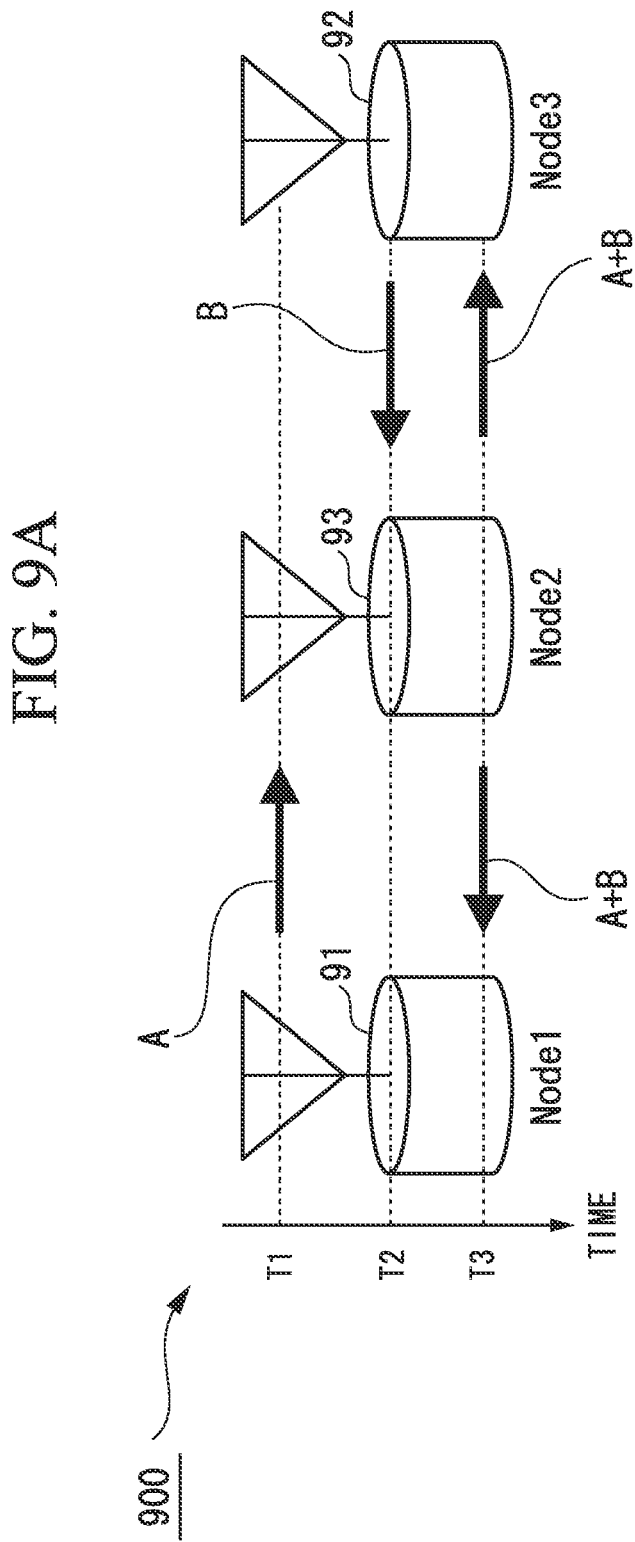

US 8,914,714 B2

WIRELESS COMMUNICATION SYSTEM, WIRELESS RELAY STATION APPARATUS, WIRELESS TERMINAL STATION APPARATUS, AND WIRELESS COMMUNICATION METHOD

CROSS-REFERENCE TO RELATED APPLICATIONS

This application is a 371 U.S. National Stage of International Application No. PCT/JP2010/066899, filed Sep. 29, 2010, which claims priority to Japanese Patent Application No. 2009-233740, filed Oct. 7, 2009, the entire disclosures of which applications are incorporated herein by reference.

TECHNICAL FIELD

The present invention relates to a wireless communication system which employs network coding, a wireless relay station apparatus, a wireless terminal station apparatus, and a wireless communication method.

Priority is claimed on Japanese Patent Application No. 2009-233740 filed Oct. 7, 2009, the content of which is incorporated herein by reference.

BACKGROUND ART

In a wireless communication system using multi-hop communication such as an ad-hoc network, there is a problem in that when only one channel is available and one wireless relay station apparatus is shared by a plurality of communication flows, since the wireless relay station apparatus alternately relays packets of the communication flows, the wireless relay station apparatus may become a bottleneck of system throughput.

As a means for solving this problem, there has been proposed technology in which the wireless relay station apparatus demodulates the packets of the respective communication flows into bit signals, performs network coding (NC) on sequences of the demodulated bit signals, and collectively transmits the sequences of the network coded bit signals to a wireless communication apparatus of a destination station (Non-patent Documents 1 and 2). The network coding indicates coding for superposing the packets of the respective communication flows through linear coding based on a predetermined generating formula.

The wireless communication apparatus of the destination station performs linear decoding based on the generating formula on a packet of a relayed signal received from the wireless relay station apparatus, thereby acquiring a desired packet. In this way, the wireless relay station apparatus superposes the packets of the plurality of communication flows and performs a relay function by collectively transmitting the superposed packets, so that it is possible to reduce the number of transmissions of the wireless relay station apparatus and to shorten the time until the communication of the wireless communication system is completed. As a result, it is possible to improve the throughput of the wireless communication system.

Hereinafter, performing the network coding on a packet will be referred to as NC encoding and decoding an NC encoded packet will be referred to as NC decoding.

A description will be given of the case in which NC technology is applied to Alice-and-Bob topology, which is the topology of the simplest multi-hop communication, and bit-wise exclusive OR (XOR) is used as an example of linear coding. Furthermore, a network coded packet is defined as an NC packet, and a packet before network coding and a non-network-coded packet are defined as a native packet.

Hereinafter, with reference to FIG. 9A and FIG. 9B, packet communication performed by a wireless communication system 900 with the Alice-and-Bob topology will be described. FIG. 9A is a diagram illustrating the configuration of the wireless communication system 900. FIG. 9B is a flowchart illustrating a process of a wireless relay station apparatus 93 provided in the wireless communication system 900.

It is to be noted that in FIG. 9A, "A" denotes a signal which is transmitted from a wireless terminal station apparatus 91 (Node 1) at a time T1, "B" denotes a signal which is transmitted from a wireless terminal station apparatus 92 (Node 3) at a time T2, and "A+B" denotes a signal which is transmitted from the wireless relay station apparatus 93 (Node 2) at a time T3.

More specifically, FIG. 9A is a diagram illustrating the outline of communication in the wireless communication system 900 with the Alice-and-Bob topology. In this topology, the wireless terminal station apparatuses 91 and 92 (Nodes 1 and 3) arranged at both ends perform bi-directional communication therebetween through the wireless relay station apparatus 93 (Node 2). The following description will be given on the assumption that transmission of each node is performed at a predetermined time slot, and signals transmitted from the respective nodes do not interfere with one another. FIG. 9B is a flowchart illustrating a relay process of the wireless relay station apparatus 93. The size of a packet A transmitted from the wireless terminal station apparatus 91 is 1000 bytes and the size of a packet B transmitted from the wireless terminal station apparatus 92 is 700 bytes. Furthermore, a description will be given of the case in which a coding rate $R_A$ of the packet A and a coding rate $R_B$ of the packet B that are required for satisfying predetermined communication quality are 2/3 and 1/2, respectively.

It is to be noted that a packet corresponds to information to be transmitted, a modulation symbol corresponds to a signal obtained by modulating (mapping) a bit signal included in a packet or the like in a baseband, and an RF (Radio Frequency) signal corresponds to a signal obtained by up-converting the modulation symbol into an RF band.

First, at the time T1, the wireless terminal station apparatus 91 transmits an RF signal A of the packet A to the wireless relay station apparatus 93 and stores the packet A. The wireless relay station apparatus 93 receives the RF signal A transmitted by the wireless terminal station apparatus 91, and stores a packet A obtained by decoding the received RF signal A.

Next, at the time T2, the wireless terminal station apparatus 92 transmits an RF signal B of the packet B to the wireless relay station apparatus 93 and stores the packet B. The wireless relay station apparatus 93 receives the RF signal B transmitted by the wireless terminal station apparatus 92, and stores a packet B obtained by decoding the received RF signal B (step S901).

Then, at the time T3, the wireless relay station apparatus 93 compares a packet length $L_A$ (1000 bytes) with a packet length $L_B$ (700 bytes), appends zero padding with a data length of $|L_A-L_B|$ (300 bytes) to an end of an information bit sequence of the packet B with a shorter packet length, and allows the packet lengths of the packet A and the packet B to coincide with each other (step S902). Next, the wireless relay station apparatus 93 performs NC encoding on the packet A and the packet B through XOR to generate one NC packet C (step S903), and performs error correction encoding with a coding rate of 1/2 on the generated NC packet C (step S904). In addition, the wireless relay station apparatus 93 performs multicast transmission of an RF signal C to the wireless terminal station apparatuses 91 and 92 (steps S905 and S906), wherein the RF signal C is obtained by modulating and up-converting the error correction encoded NC packet C.

Through the multicast transmission, a plurality of wireless terminal station apparatuses are designated as destination stations in header information, so that the same information is simultaneously transmitted to the plurality of destination stations using the multicast property of wireless communication. Furthermore, the packet lengths of the packet A and the packet B are included in the header information together with information indicating the destination stations. The wireless terminal station apparatuses 91 and 92 acquire the packet lengths from the header information of the received RF signal C.

Upon receipt of the RF signal C transmitted from the wireless relay station apparatus 93, the wireless terminal station apparatus 91 adjusts an output level through AGC (Auto Gain Control) using the received RF signal C, and down-converts and demodulates the received RF signal C to acquire an NC packet C. When the packet length of the NC packet C is longer than the packet length of the stored packet A, the wireless terminal station apparatus 91 performs zero padding corresponding to the difference between two packet lengths on the packet A to allow the packet length of the zero-padded packet A to coincide with the packet length of the NC packet C, and performs NC decoding through an XOR operation on the zero-padded packet A and the NC packet C to acquire a packet B.

In contrast, when the packet length of the NC packet C coincides with the packet length of the stored packet A, the wireless terminal station apparatus 91 performs NC decoding through an XOR operation on the NC packet C and the packet A. Then, the wireless terminal station apparatus 91 acquires the packet B from a packet obtained by the NC decoding based on the packet length of the packet B included in the header information.

Similarly to the wireless terminal station apparatus 91, the wireless terminal station apparatus 92 also demodulates the NC packet C from the RF signal C. When the packet length of the NC packet C is longer than the packet length of the stored packet B, the wireless terminal station apparatus 92 performs zero padding corresponding to the difference between two packet lengths on the packet B so that the packet length of the zero-padded packet B coincides with the packet length of the NC packet C, and performs NC decoding through an XOR operation to acquire a packet A. In contrast, when the packet length of the NC packet C coincides with the packet length of the stored packet B, the wireless terminal station apparatus 92 performs NC decoding through an XOR operation on the NC packet C and the packet B. Then, the wireless terminal station apparatus 92 acquires the packet A by deleting a portion appended through the zero padding from a packet obtained by the NC decoding based on the packet length of the packet A included in the header information.

As described above, the wireless relay station apparatus 93 collectively performs multicast transmission of the packets received from the wireless terminal station apparatuses 91 and 92, thereby transmitting the packet B to the wireless terminal station apparatus 91 and transmitting the packet A to the wireless terminal station apparatus 92 using three time slots reduced by one time slot, as compared with the case in which packets are individually relayed.

PRIOR ART DOCUMENTS

Non-patent Documents

Non-patent Document 1: "XORs in The Air: Practical Wireless Network Coding," Sachin Katti, Hariharan Rahul, et al., Proc. ACM SIGCOMM 2006, Pisa, Italy, September 2006, pp. 243-254

Non-patent Document 2: "Network information flow," R. Ahlswede, N. Cai, S. Li, and R. Yeung, IEEE Trans. Inf. Theory, vol. 46, no. 4, pp. 1204-1216, July 2000

DISCLOSURE OF INVENTION

Problems to be Solved by the Invention

However, since the NC encoding is performed in a bitwise fashion, bit lengths (information amounts) of native packets to be subject to the NC encoding need to be equal to each other. Therefore, the network coding performs a process in which the zero padding is performed on information bit sequences of the native packets so as to allow the packet lengths of the native packets to coincide with each other.

Specifically, in order to achieve coincidence with the length of a packet having the longest packet length (hereinafter referred to as max_L) among the native packets to be subject to the NC encoding, bit(s) are appended to the other native packets with relatively short packet lengths through the zero padding, thereby allowing the packet lengths to coincide with each other. As described above, the NC encoding is performed on the information bit sequences of the native packets with the same packet length, and the error correction (FEC) encoding is performed on the information bit sequences of the NC packets. To this end, the zero padding for allowing the packet lengths to coincide with each other is performed on the information bit sequences before the NC encoding.

Meanwhile, even if redundant bit(s) are appended by performing the zero padding on the information bit sequences, the redundancy of information is not increased, and thus it is not possible to improve transmission quality. In addition, since the error correction encoding is performed collectively on the NC encoded information bit sequences, the improvement effects of transmission quality through the error correction encoding for all the packets, which are NC encoded into NC packets, are also the same. Therefore, there is a problem in that it is not possible to adjust the degree of improvement of transmission quality for each of destinations of the packets.

Furthermore, in a system for transmitting packets by relaying the packets a plurality of times, coding rates for satisfying required transmission quality may be different from one another due to a difference or the like of transmission path environments at the second hop of the packets. The second hop indicates that a wireless relay station apparatus transmits (relays) a packet received from a wireless terminal station apparatus to another wireless terminal station apparatus.

At this time, the wireless relay station apparatus performs error correction encoding on an NC packet C in accordance with the lowest coding rate among required coding rates. Specifically, using the longest data length max_L among the packet lengths of received packets and the lowest coding rate (hereinafter referred to as min_R) among the required coding rates, a data length Lc of the NC packet C is expressed by max_L/min_R. Since the data length Lc of the NC packet C after the error correction encoding is determined by the longest packet length and the lowest coding rate, there is a problem in that the length of data to be transmitted is increased, resulting in the deterioration in system throughput.

The present invention has been made in order to solve the foregoing problems, and an object thereof is to provide a wireless communication system that uses network coding, a wireless relay station apparatus, a wireless terminal station apparatus, and a wireless communication method that are capable of setting transmission quality for each of destinations of packets and improving throughput.

Means for Solving the Problems (1) In order to solve the foregoing problems, the present invention provides a wireless relay station apparatus that transmits a first packet and a second packet to a plurality of wireless terminal station apparatuses, the first packet being different from the second packet, the wireless relay station apparatus including: an error correction encoding unit that selects coding rates to be used for the first packet and the second packet in accordance with communication quality required for the first packet and the second packet, and generates error correction encoded packets having the same data length from the first packet and the second packet using the selected coding rates; a network encoding circuit that performs network encoding on error correction encoded first and second packets to generate a network encoded packet; and a transmission circuit that transmits the network encoded packet to the plurality of wireless terminal station apparatuses.

(2) Furthermore, in the wireless relay station apparatus, the error correction encoding unit may calculate packet lengths if error correction encoding is performed using the coding rates required for the first packet and the second packet, may reduce a coding rate corresponding to a packet having a shorter calculated packet length, and may perform error correction encoding such that the error correction encoded first packet and the error correction encoded second packet have the same packet length.

(3) Furthermore, in the wireless relay station apparatus, when there is a difference between data lengths if the error correction encoding is performed on the first packet and the second packet, the error correction encoding unit may generate a concatenation bit by copying a bit included in an error correction encoded packet having a shorter data length, may append the concatenation bit to the error correction encoded packet having the shorter data length, and may allow the data lengths of the error correction encoded first and second packets to coincide with each other.

(4) Furthermore, in the wireless relay station apparatus, when multilevel quadrature modulation is used for wireless transmission from the wireless relay station apparatus to the plurality of wireless terminal station apparatuses, the error correction encoding unit may preferentially select a least significant bit from among bits which constitute a modulation symbol generated by the multilevel quadrature modulation, as a copy source bit of the concatenation bit.

(5) Furthermore, in the wireless relay station apparatus, the error correction encoding unit may collectively arrange concatenation bits at a predetermined position of the error correction encoded packet having the shorter data length.

(6) Furthermore, in the wireless relay station apparatus, the error correction encoding unit may arrange a bit constituting the concatenation bit which is obtained by copying a copy source bit, at a position adjacent to the copy source bit of the bit constituting the concatenation bit.

(7) Furthermore, in the wireless relay station apparatus, the error correction encoding unit may arrange a bit constituting the concatenation bit at a position spaced apart from a copy source bit of the bit constituting the concatenation bit by a constant bit interval.

(8) In addition, the present invention provides a wireless communication system including: a wireless relay station apparatus that transmits a first packet and a second packet to a plurality of wireless terminal station apparatuses, the first packet being different from the second packet, wherein the wireless relay station apparatus includes: an error correction encoding unit that selects coding rates to be used for the first packet and the second packet in accordance with communication quality required for the first packet and the second packet, and generates error correction encoded packets having the same data length from the first packet and the second packet using the selected coding rates; a network encoding circuit that performs network encoding on error correction encoded first and second packets to generate a network encoded packet; and a transmission circuit that transmits the network encoded packet to the plurality of wireless terminal station apparatuses, and among the plurality of wireless terminal station apparatuses, each of a wireless terminal station apparatus which stores a third packet equal to the first packet in a storing circuit and a wireless terminal station apparatus which stores a third packet equal to the second packet in a storing circuit includes: an error correction encoding unit that performs error correction encoding on the third packet; a network decoding circuit that performs network decoding on the network encoded packet that has been received using an error correction encoded third packet to generate a decoded packet; and an error correction decoding unit that performs error correction decoding on the decoded packet.

(9) Furthermore, in the wireless communication system, the error correction encoding unit may calculate packet lengths if error correction encoding is performed using the coding rates required for the first packet and the second packet, may reduce a coding rate corresponding to a packet having a shorter calculated packet length, and may perform error correction encoding such that the error correction encoded first packet and the error correction encoded second packet have the same packet length.

(10) Furthermore, in the wireless communication system, when there is a difference between data lengths if error correction encoding is performed on the first packet and the second packet, the error correction encoding unit may generate a concatenation bit by copying a bit included in an error correction encoded packet having a shorter data length, may append the concatenation bit to the error correction encoded packet having the shorter data length, and may allow the data lengths of the error correction encoded first and second packets to coincide with each other, and the error correction decoding unit may extract the error correction encoded packet having the shorter data length and the concatenation bit from the decoded packet, and may perform error correction decoding by performing soft combining on the error correction encoded packet having the shorter data length and the concatenation bit.

(11) Furthermore, in the wireless communication system, when multilevel quadrature modulation is used for wireless transmission from the wireless relay station apparatus to the plurality of wireless terminal station apparatuses, the error correction encoding unit may preferentially select a least significant bit from among bits which constitute a modulation symbol generated by the multilevel quadrature modulation, as a copy source bit of the concatenation bit.

(12) Furthermore, in the wireless communication system, the error correction encoding unit may collectively arrange concatenation bits at a predetermined position of the error correction encoded packet having the shorter data length.

(13) Furthermore, in the wireless communication system, the error correction encoding unit may arrange a bit constituting the concatenation bit which is obtained by copying a copy source bit, at a position adjacent to the copy source bit of the bit constituting the concatenation bit.

(14) Furthermore, in the wireless communication system, the error correction encoding unit may arrange a bit constituting the concatenation bit at a position spaced apart from a copy source bit of the bit constituting the concatenation bit by a constant bit interval.

(15) In addition, the present invention provides a wireless terminal station apparatus in a wireless communication system provided with a wireless relay station apparatus that transmits a first packet and a second packet to a plurality of wireless terminal station apparatuses, the first packet being different from the second packet, the wireless terminal station apparatus including: a reception circuit that receives a network encoded packet, the network encoded packet being generated such that the wireless relay station apparatus selects coding rates to be used for the first packet and the second packet in accordance with communication quality required for the first packet and the second packet, generates error correction encoded packets having the same data length from the first packet and the second packet using the selected coding rates, and performs network encoding on error correction encoded first and second packets to generate the network encoded packet; a storing circuit that stores a third packet equal to one of the first packet and the second packet; an error correction encoding unit that performs error correction encoding on the third packet; a network decoding circuit that performs network decoding on the network encoded packet that has been received using an error correction encoded third packet to generate a decoded packet; and an error correction decoding unit that performs error correction decoding on the decoded packet.

(16) In addition, the present invention provides a wireless communication method in a wireless communication system provided with a wireless relay station apparatus that transmits a first packet and a second packet to a plurality of wireless terminal station apparatuses, the first packet being different from the second packet, the wireless communication method including: a step of, by an error correction encoding unit of the wireless relay station apparatus, selecting coding rates to be used for the first packet and the second packet in accordance with communication quality required for the first packet and the second packet, and generating error correction encoded packets having the same data length from the first packet and the second packet using the selected coding rates; a step of, by a network encoding circuit of the wireless relay station apparatus, performing network encoding on error correction encoded first and second packets to generate a network encoded packet; a step of, by a transmission circuit of the wireless relay station apparatus, transmitting the network encoded packet to the plurality of wireless terminal station apparatuses; a step of, by an error correction encoding unit of a wireless terminal station apparatus which stores a third packet equal to the first packet in a storing circuit among the plurality of wireless terminal station apparatuses, performing error correction encoding on the stored third packet; a step of, by an error correction encoding unit of a wireless terminal station apparatus which stores a third packet equal to the second packet in a storing circuit among the plurality of wireless terminal station apparatuses, performing error correction encoding on the stored third packet; a step of, by network decoding circuits of the plurality of wireless terminal station apparatuses, performing network decoding on the network encoded packet that has been received using the error correction encoded third packet to generate a decoded packet; and a step of, by error correction decoding units of the plurality of wireless terminal station apparatuses, performing error correction decoding on the decoded packet.

Effects of the Invention

According to the present invention, in a wireless communication system using network coding, it is possible to set transmission quality for each of destinations of packets and improve the throughput of the wireless communication system.

BRIEF DESCRIPTION OF DRAWINGS

FIG. 6C is a diagram illustrating an example of the arrangement position of concatenated bits in accordance with the above-mentioned embodiment.

FIG. 9A is a diagram illustrating the configuration of a wireless communication system 900.

MODE(S) FOR CARRYING OUT THE INVENTION

Hereinafter, embodiments of the present invention will be described with reference to the accompanying drawings.

First Embodiment

Figure 1:
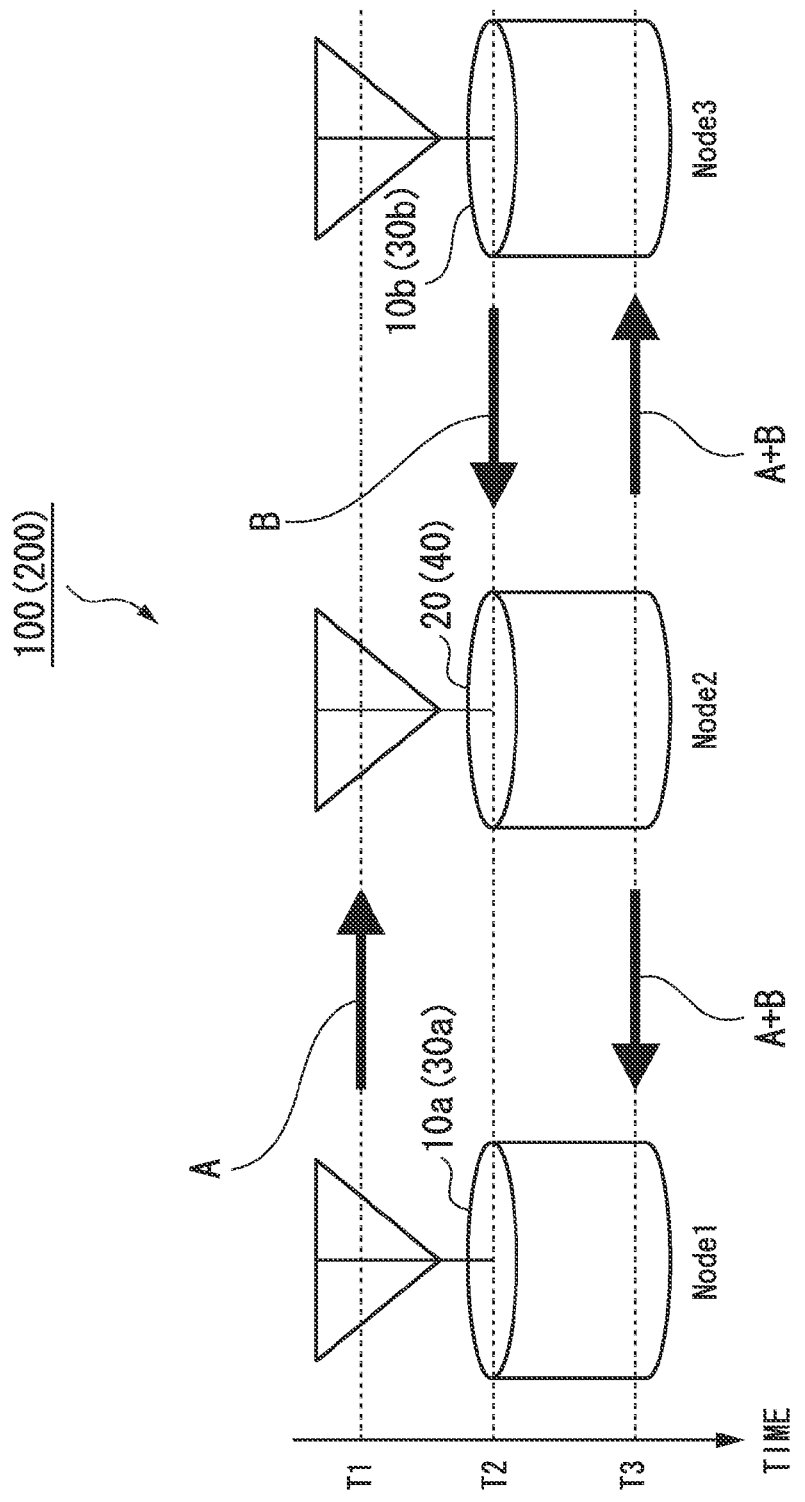
FIG. 1 is a schematic diagram illustrating the configuration of a wireless communication system 100 in accordance with a first embodiment of the present invention and a wireless communication system 200 in accordance with a second embodiment of the present invention.

FIG. 1 is a schematic diagram illustrating the configuration of a wireless communication system 100 in accordance with a first embodiment. Hereinafter, an example of a network configuration will be described using Alice-and-Bob topology. As illustrated in the figure, the wireless communication system 100 in accordance with the present embodiment includes wireless terminal station apparatuses 10a and 10b arranged at both ends, and a wireless relay station apparatus 20 arranged between the wireless terminal station apparatuses 10a and 10b. Furthermore, the wireless terminal station apparatuses 10a and 10b have the same configuration, and they will be referred to as a wireless terminal station apparatus(es) 10 when indicating one or both of them.

It is to be noted that in FIG. 1, "A" denotes a signal which is transmitted from the wireless terminal station apparatus 10a (a wireless terminal station apparatus 30a in a second embodiment which will be described later) (Node 1) at a time T1, "B" denotes a signal which is transmitted from the wireless terminal station apparatus 10b (a wireless terminal station apparatus 30b in the second embodiment) (Node 3) at a time T2, and "A+B" denotes a signal which is transmitted from the wireless relay station apparatus 20 (a wireless relay station apparatus 40 in the second embodiment) (Node 2) at a time T3.

Figure 2:
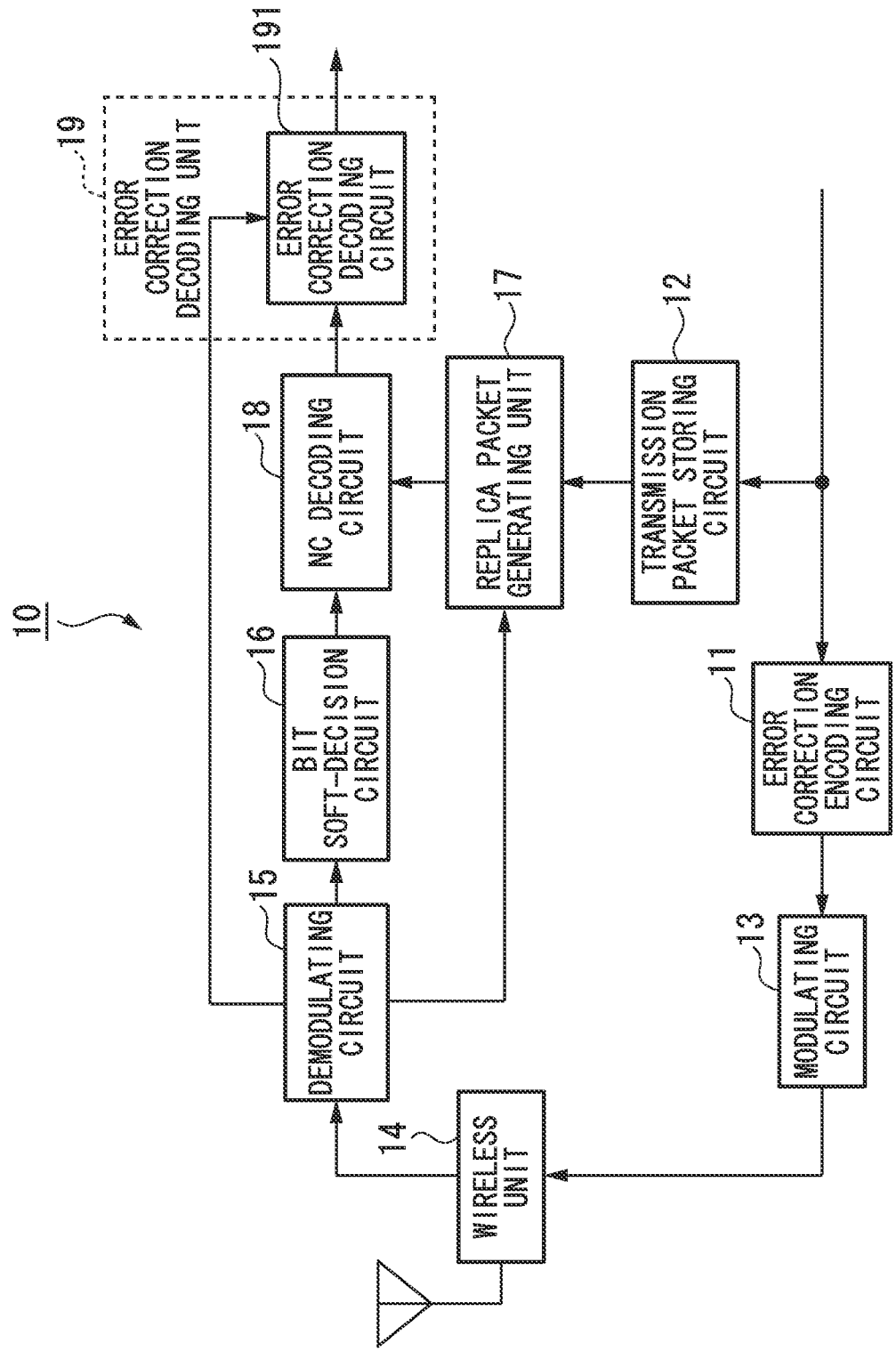
FIG. 2 is a schematic block diagram illustrating the configuration of a wireless terminal station apparatus 10 in accordance with the first embodiment.

FIG. 2 is a schematic block diagram illustrating the configuration of the wireless terminal station apparatus 10 in accordance with the present embodiment. As illustrated in the figure, the wireless terminal station apparatus 10 includes an error correction encoding circuit 11, a transmission packet storing circuit 12, a modulating circuit 13, a wireless unit 14, a demodulating circuit 15, a bit soft-decision circuit 16, a replica packet generating unit 17, an NC (network coding) decoding circuit 18, and an error correction decoding unit 19. The error correction decoding unit 19 includes an error correction decoding circuit 191.

A packet to be transmitted is input to the error correction encoding circuit 11 and the transmission packet storing circuit 12. The error correction encoding circuit 11 performs error correction encoding on the input packet and outputs an error correction encoded packet to the modulating circuit 13. The transmission packet storing circuit 12 stores the input packet.

The modulating circuit 13 modulates (maps) bit information included in the error correction encoded packet in a baseband to generate a modulation symbol, and outputs the generated modulation symbol to the wireless unit 14.

The wireless unit 14 up-converts the modulation symbol output from the modulating circuit 13 into an RF signal, and transmits the converted RF signal through an antenna. Furthermore, the wireless unit 14 adjusts an output level through AGC (Auto Gain Control) using an RF signal received through the antenna, down-converts the received RF signal into a modulation symbol, and outputs the converted modulation symbol to the demodulating circuit 15. The demodulating circuit 15 outputs a signal obtained by demodulating (demapping) the modulation symbol output from the wireless unit 14 in a baseband to the bit soft-decision circuit 16, and outputs header information received together with a packet to the replica packet generating unit 17 and the error correction decoding unit 19.

The bit soft-decision circuit 16 performs soft decision on the signal input from the demodulating circuit 15, and outputs a soft-decision signal including soft-decision values for information bits of the packet to the NC decoding circuit 18. The replica packet generating unit 17 reads the packet stored in the transmission packet storing circuit 12, performs error correction encoding on the read packet using a coding rate included in the header information input from the demodulating circuit 15, generates a replica packet which is an error correction encoded packet, and outputs it to the NC decoding circuit 18.

The NC decoding circuit 18 outputs a packet which is obtained by performing NC decoding on the soft-decision signal input from the bit soft-decision circuit 16 using the replica packet input from the replica packet generating unit 17, to the error correction decoding circuit 191. The error correction decoding circuit 191 performs error correction decoding on the packet which is NC decoded by the NC decoding circuit 18, and outputs the decoded packet.

Figure 3:
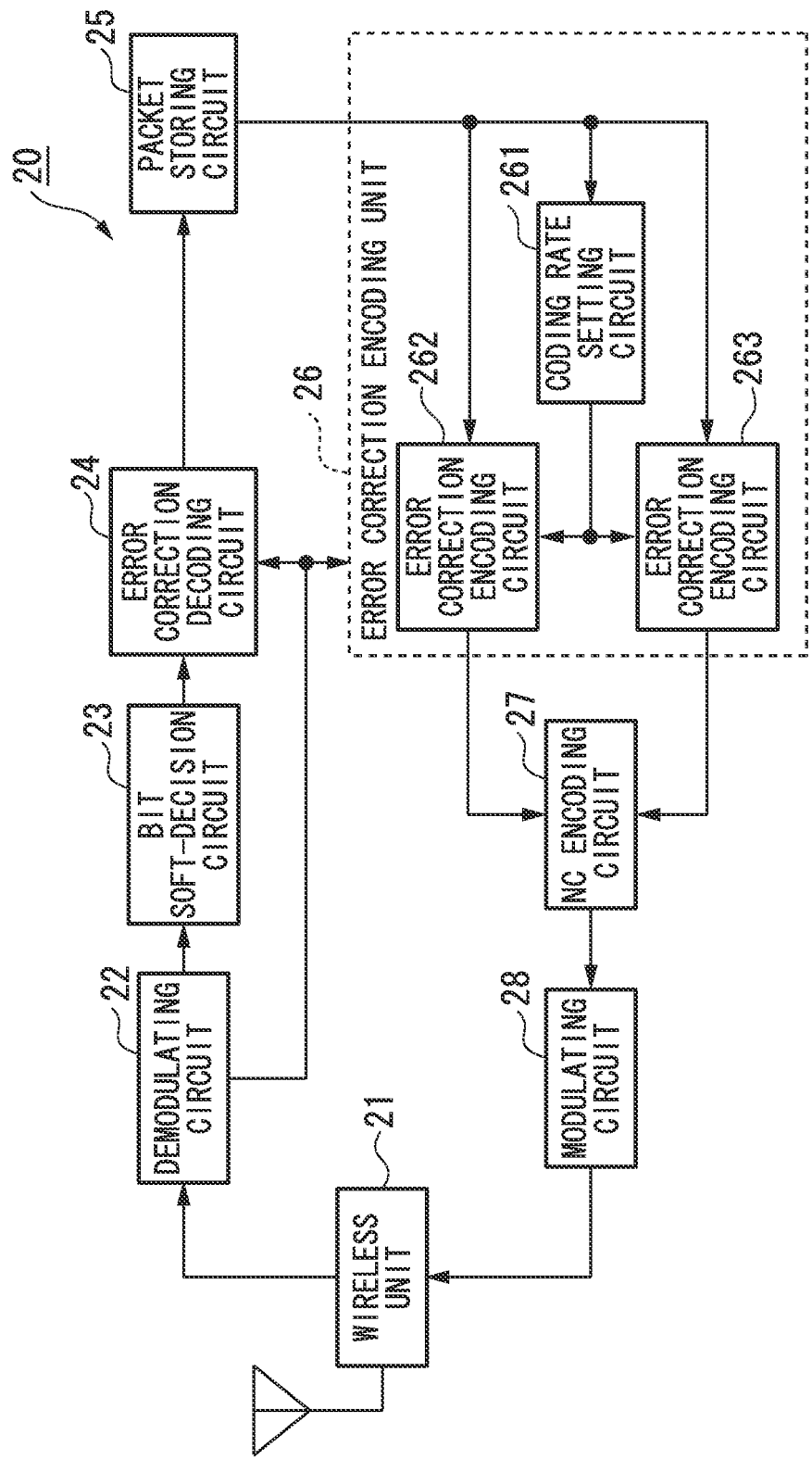
FIG. 3 is a schematic block diagram illustrating the configuration of a wireless relay station apparatus 20 in accordance with the above-mentioned embodiment.

FIG. 3 is a schematic block diagram illustrating the configuration of a wireless relay station apparatus 20 in accordance with the present embodiment. As illustrated in the figure, the wireless relay station apparatus 20 includes a wireless unit 21, a demodulating circuit 22, a bit soft-decision circuit 23, an error correction decoding circuit 24, a packet storing circuit 25, an error correction encoding unit 26, an NC encoding circuit 27, and a modulating circuit 28. The error correction encoding unit 26 includes a coding rate setting circuit 261 and error correction encoding circuits 262 and 263.

The wireless unit 21 adjusts an output level through AGC (Auto Gain Control) using an RF signal received through an antenna, down-converts the received RF signal into a modulation symbol, and outputs the converted modulation symbol to the demodulating circuit 22. The demodulating circuit 22 outputs a signal obtained by demodulating (demapping) the modulation symbol output from the wireless unit 21 in a baseband, to the bit soft-decision circuit 23. Furthermore, the demodulating circuit 22 outputs header information of a packet to the error correction decoding circuit 24 and the error correction encoding unit 26.

The bit soft-decision circuit 23 performs soft decision on the signal input from the demodulating circuit 22, and outputs a soft-decision signal including soft-decision values for information bits of the packet, to the error correction decoding circuit 24. The error correction decoding circuit 24 decodes the packet by performing error correction decoding on the soft-decision signal of the packet input from the bit soft-decision circuit 23, based on a coding rate of the packet to be decoded which is included in the header information input from the demodulating circuit 22, and outputs the decoded packet to the packet storing circuit 25. The packet storing circuit 25 stores the packet input from the error correction decoding circuit 24.

The coding rate setting circuit 261 reads two packets A and B to be transmitted from the packet storing circuit 25, and calculates data lengths ($D_A = L_A/R_A$ and $D_B = L_B/R_B$, where $L_A$ denotes the data length of the packet A and $L_B$ denotes the data length of the packet B) if error correction encoding is performed using coding rates ($R_A$ and $R_B$) required for the two packets. Furthermore, the coding rate setting circuit 261 determines the longer one of the two calculated data lengths as a data length of an NC encoded packet, and reduces the coding rate of the packet corresponding to the shorter one of the two data lengths, so that the data length of the packet after the error correction encoding is equal to the data length of another packet after the error correction encoding.

Specifically, when the data lengths after the error correction encoding satisfy $D_A < D_B$, the coding rate setting circuit 261 changes the coding rate for the packet A from $R_A$ to $R_A'$ ($=L_A/(L_B/R_B)$), outputs the coding rate $R_A'$ to the error correction encoding circuit 262, and outputs the coding rate $R_B$ to the error correction encoding circuit 263. In contrast, when the data lengths after the error correction encoding satisfy $D_A > D_B$, the coding rate setting circuit 261 changes the coding rate for the packet B from $R_B$ to $R_B'$ ($=L_B/(L_A/R_A)$), outputs the coding rate $R_A$ to the error correction encoding circuit 262, and outputs the coding rate $R_B'$ to the error correction encoding circuit 263.

Here, the coding rates $R_A$ and $R_B$ used in the coding rate setting circuit 261 are determined based on transmission path characteristics estimated when communications are performed with the wireless terminal station apparatuses 10, and required communication quality, or they are predetermined values through, for example, pre-notification of the coding rates of the packets from the wireless terminal station apparatuses 10.

The error correction encoding circuits 262 and 263 read the packets from the packet storing circuit 25, perform error correction encoding on the read packets using the coding rates input from the coding rate setting circuit 261, and output the error correction encoded packets to the NC encoding circuit 27. Furthermore, the error correction encoding circuits 262 and 263 are provided with encoders for realizing the coding rates input from the coding rate setting circuit 261, pre-store code books which define the details of bit puncture patterns, and perform a process in accordance with indexes for the code books input from the coding rate setting circuit 261. Furthermore, the indexes for the code books are included in header information and are transmitted together with an NC encoded packet to the wireless terminal station apparatuses 10.

The NC encoding circuit 27 performs NC encoding on the error correction encoded packets input from the error correction encoding circuits 262 and 263 using linear coding, and outputs the NC encoded packet to the modulating circuit 28. The NC encoding, for example, uses a function having linearity such as an XOR (exclusive OR) operation.

The modulating circuit 28 modulates the packet NC encoded by the NC encoding circuit 27 in a baseband, and outputs the converted modulation symbol to the wireless unit 21.

Figure 4:
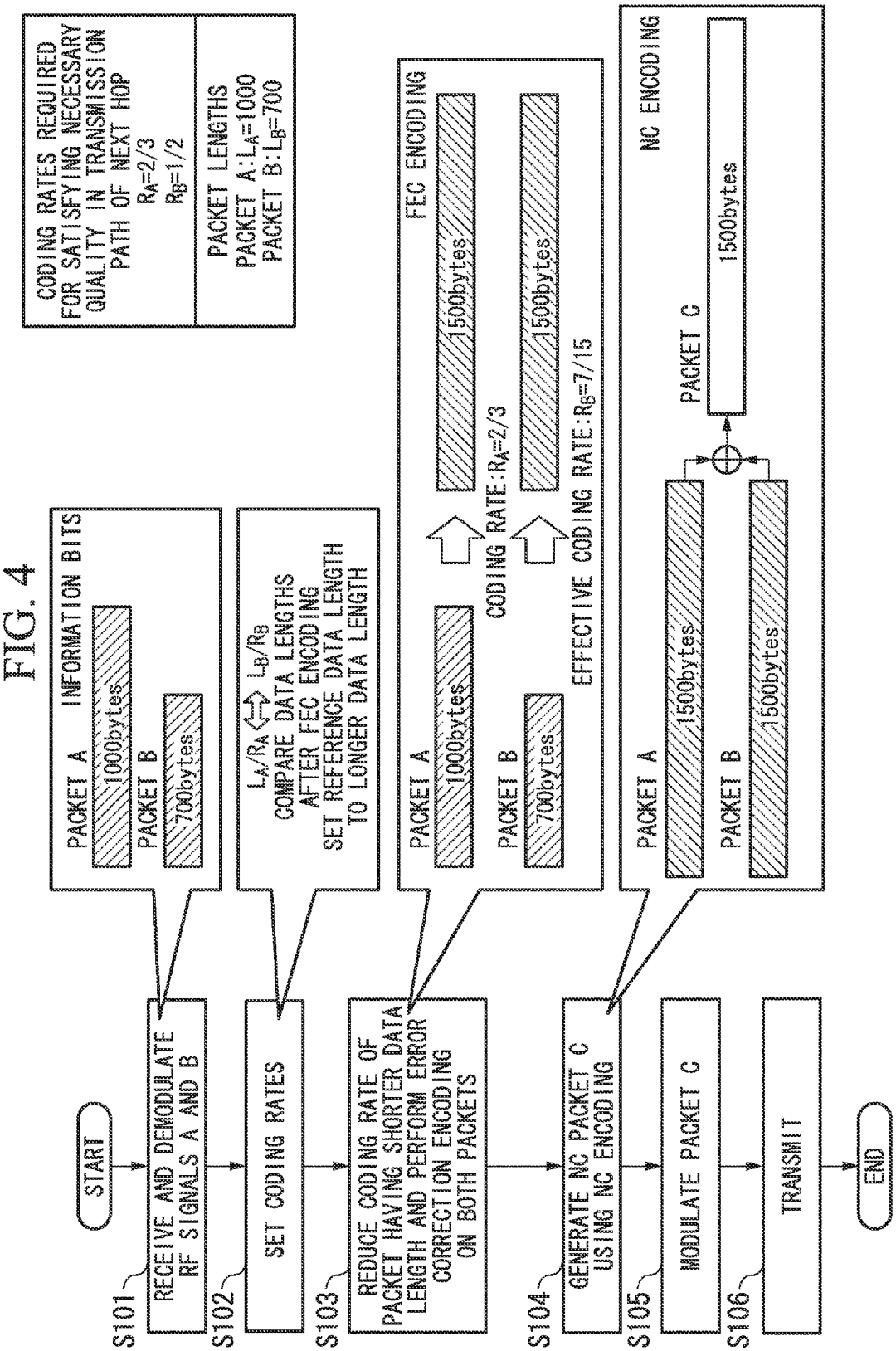
FIG. 4 is a flowchart illustrating the operation of the wireless relay station apparatus 20 in accordance with the above-mentioned embodiment.

Next, the operation of the wireless communication system 100 in accordance with the present embodiment will be described with reference to FIG. 1 and FIG. 4. FIG. 4 is a flowchart illustrating the operation of the wireless relay station apparatus 20 in accordance with the present embodiment. Hereinafter, a description will be given of the case in which the packet lengths $L_A$ and $L_B$ and the coding rates $R_A$ and $R_B$ are as follows. The packet length $L_A$ of the packet A transmitted from the wireless terminal station apparatus 10a to the wireless terminal station apparatus 10b is set to 1000 bytes, and the coding rate $R_A$ required for satisfying communication quality that is necessary for a transmission path of the second hop from the wireless relay station apparatus 20 to the wireless terminal station apparatus 10b is set to 2/3. Furthermore, the packet length $L_B$ of the packet B transmitted from the wireless terminal station apparatus 10b to the wireless terminal station apparatus 10a is set to 700 bytes, and the coding rate $R_B$ required for satisfying communication quality that is necessary for a transmission path of a hop from the wireless relay station apparatus 20 to the wireless terminal station apparatus 10a is set to 1/2.

At the time T1, in the wireless terminal station apparatus 10a (Node 1), a packet A to be transmitted is input to the error correction encoding circuit 11 and the transmission packet storing circuit 12. The error correction encoding circuit 11 performs error correction encoding on the input packet A and outputs an error correction encoded packet A to the modulating circuit 13. The transmission packet storing circuit 12 stores the input packet A.

The modulating circuit 13 modulates the error correction encoded packet A and converts it into a modulation symbol A, and outputs the converted modulation symbol A to the wireless unit 14. The wireless unit 14 up-converts the input modulation symbol A into an RF signal A, and transmits the generated RF signal A to the wireless relay station apparatus 20 through the antenna.

In the wireless relay station apparatus 20 (Node 2), the wireless unit 21 receives the RF signal A through the antenna, down-converts the received RF signal A into a modulation symbol A, and outputs the converted modulation symbol A to the demodulating circuit 22. The demodulating circuit 22 outputs a signal of a packet A obtained by demodulating (demapping) the input modulation symbol A to the bit soft-decision circuit 23. The bit soft-decision circuit 23 performs soft decision on the input signal of the packet A, and outputs a soft-decision signal of the packet A to the error correction decoding circuit 24. The error correction decoding circuit 24 stores the packet A, which is obtained by performing error correction decoding on the input soft-decision signal of the packet A, in the packet storing circuit 25.

At the time T2, in the wireless terminal station apparatus 10b (Node 3), a packet B to be transmitted is input to the error correction encoding circuit 11 and the transmission packet storing circuit 12. The wireless terminal station apparatus 10b converts the packet B into an RF signal B and outputs it to the wireless relay station apparatus 20 in the same manner as the wireless terminal station apparatus 10a.

In the wireless relay station apparatus 20, the wireless unit 21 receives the RF signal B through the antenna, and, similarly to the RF signal A, a packet B obtained through demodulation and error correction decoding is stored in the packet storing circuit 25. Through the operations at the time T1 and time T2, the wireless relay station apparatus 20 receives and demodulates the packet A and the packet B, and stores them in the packet storing circuit 25 (step S101).

At the time T3, in the wireless relay station apparatus 20, the coding rate setting circuit 261 reads the packets A and B from the packet storing circuit 25, calculates a data length $D_A$ ($=L_A/R_A=1500$ bytes) after error correction encoding is performed on the read packet A using a coding rate $R_A$ required for the packet A, and calculates a data length $D_B$ ($=L_B/R_B=1400$ bytes) after error correction encoding is performed on the read packet B using a coding rate $R_B$ required for the packet B. Then, the coding rate setting circuit 261 compares the data length $D_A$ with the data length $D_B$, and determines the longer one ($D_B<D_A=1500$ bytes) of the data lengths as a data length $D_C$ after error correction encoding of an NC encoded packet. Furthermore, the coding rate setting circuit 261 changes the coding rate of the packet B corresponding to the shorter one ($D_A>D_B=1400$ bytes) of the data lengths $D_A$ and $D_B$ to $R_B'$ ($=700/(1000/(2/3))=7/15$). As a consequence, the coding rate setting circuit 261 outputs the coding rate $R_A$ ($=2/3$) to the error correction encoding circuit 262, and outputs the coding rate $R_B'$ ($=7/15$) to the error correction encoding circuit 263 (step S102).

The error correction encoding circuit 262 reads the packet A from the packet storing circuit 25, performs error correction encoding on the packet A using the coding rate $R_A$ ($=2/3$) input from the coding rate setting circuit 261, and outputs an error correction encoded packet A to the NC encoding circuit 27. The error correction encoding circuit 263 reads the packet B from the packet storing circuit 25, performs error correction encoding on the packet B using the coding rate $R_B'$ ($=7/15$) input from the coding rate setting circuit 261, and outputs an error correction encoded packet B to the NC encoding circuit 27 (step S103).

The NC encoding circuit 27 performs NC encoding on the error correction encoded packets A and B input from the error correction encoding circuits 262 and 263, thereby generating an NC packet C (step S104). The modulating circuit 28 modulates the NC packet C generated by the NC encoding circuit 27 and converts it into a modulation packet C. The wireless unit 21 up-converts the modulation packet C converted by the modulating circuit 28 to convert it into an RF signal C, and transmits the converted RF signal C to the wireless terminal station apparatuses 10a and 10b through the antenna (steps S105 and S106).

In the wireless terminal station apparatus 10a, the wireless unit 14 down-converts the received RF signal C into a modulation packet C. The demodulating circuit 15 outputs a signal which is obtained by demodulating the modulation packet C converted by the wireless unit 14, to the bit soft-decision circuit 16, outputs header information including the coding rate $R_A$ (=2/3) of the packet A to the replica packet generating unit 17, and outputs header information including the coding rate $R_B'$ (=7/15) of the packet B to the error correction decoding circuit 191. The bit soft-decision circuit 16 performs soft decision on the signal of an NC packet C demodulated by the demodulating circuit 15 to generate a soft-decision signal of the NC packet C, and outputs it to the NC decoding circuit 18.

The replica packet generating unit 17 reads the packet A from the transmission packet storing circuit 12, performs error correction encoding on the read packet A using the coding rate $R_A$ input from the demodulating circuit 15, and outputs an error correction encoded packet A to the NC decoding circuit 18. The NC decoding circuit 18 performs NC decoding through an XOR operation on the NC packet C input from the bit soft-decision circuit 16 and the error correction encoded packet A input from the replica packet generating unit 17, thereby calculating an error correction encoded packet B. The error correction decoding circuit 191 calculates a packet B by performing error correction decoding on the error correction encoded packet B, which has been calculated by the NC decoding circuit 18, using the coding rate $R_B'$ (=7/15) of the packet B input from the demodulating circuit 15, and outputs the calculated packet B to an upper layer or the like.

Similarly to the wireless terminal station apparatus 10a, the wireless terminal station apparatus 10b generates a replica packet from the packet B stored in the transmission packet storing circuit 12, and performs NC decoding using the generated replica packet, thereby calculating and acquiring a packet A from the RF signal C received in the wireless unit 14.

Figure 9B:
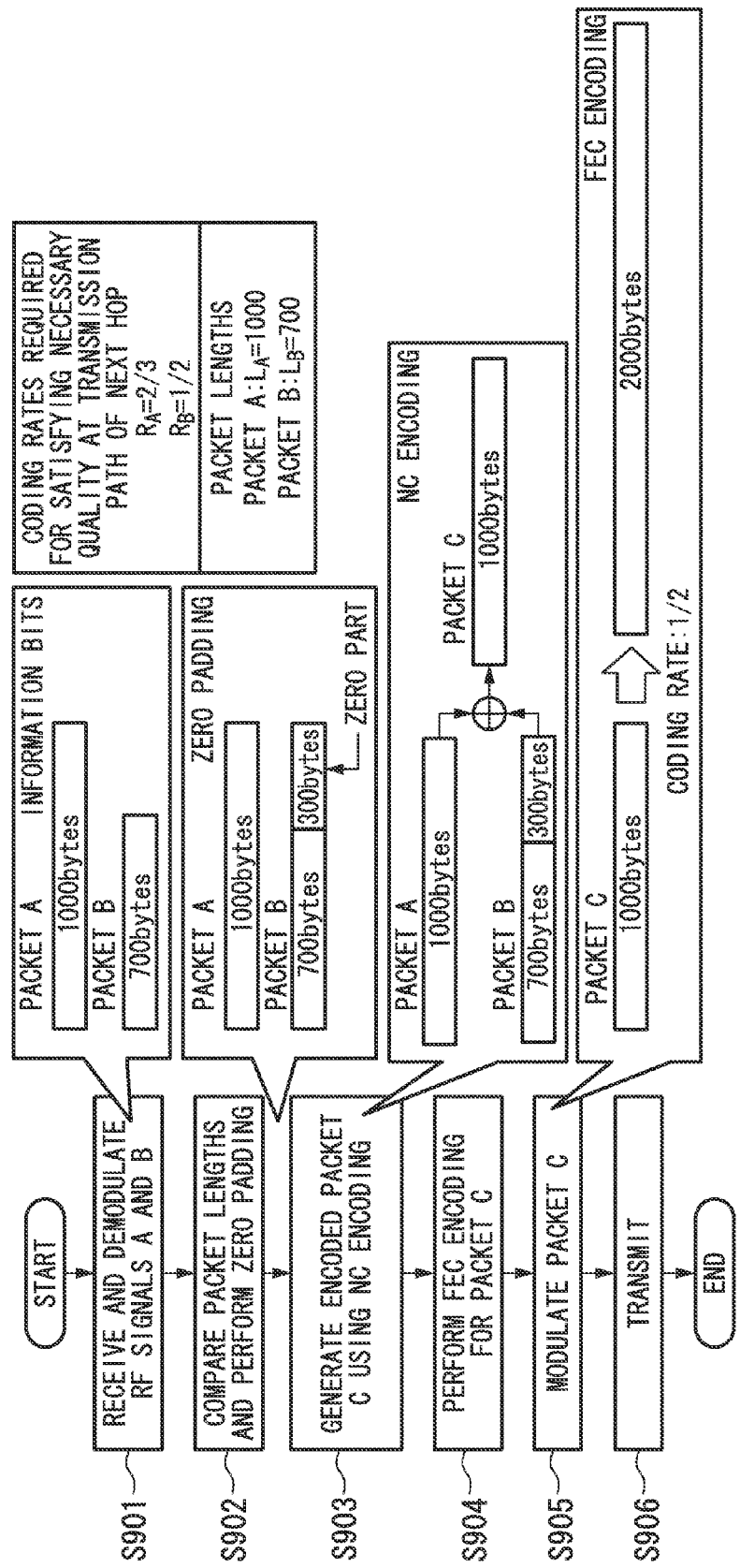
FIG. 9B is a flowchart illustrating a process of a wireless relay station apparatus 93 provided in the wireless communication system 900.

As described above, the wireless communication system 100 transmits the packet A and the packet B. In the wireless relay station apparatus 20, before the NC encoding circuit 27 performs NC encoding on the packet A and the packet B, the error correction encoding unit 26 performs error correction encoding on the packet A and the packet B. Consequently, it is possible to apply different coding rates to the packet A and the packet B, to suppress an increase in the data length of a packet to be transmitted as illustrated in FIG. 9B, and to overcome inefficiency.

At this time, the coding rate setting circuit 261 calculates data lengths if error correction encoding is performed using the coding rates required for the packet A and the packet B, and reduces the coding rate of the packet having a shorter data length so that the data lengths of the two packets after the error correction encoding coincide with each other, and thus the coding rates to be applied to the packet A and the packet B can satisfy coding rates required for desired communication quality. Furthermore, while zero padding appends redundant data not contributing to error correction, coding rates for the packet A and the packet B are changed so that data lengths after error correction encoding coincide with each other, resulting in improved transmission quality.

Second Embodiment

A wireless communication system 200 in accordance with a second embodiment is provided with two wireless terminal station apparatuses 30a and 30b, and a wireless relay station apparatus 40, similarly to the wireless communication system 100 in accordance with the first embodiment illustrated in FIG. 1. Furthermore, the wireless terminal station apparatuses 30a and 30b have the same configuration, and they will be referred to as wireless terminal station apparatus(es) 30 when indicating one or both of them.

Figure 5:
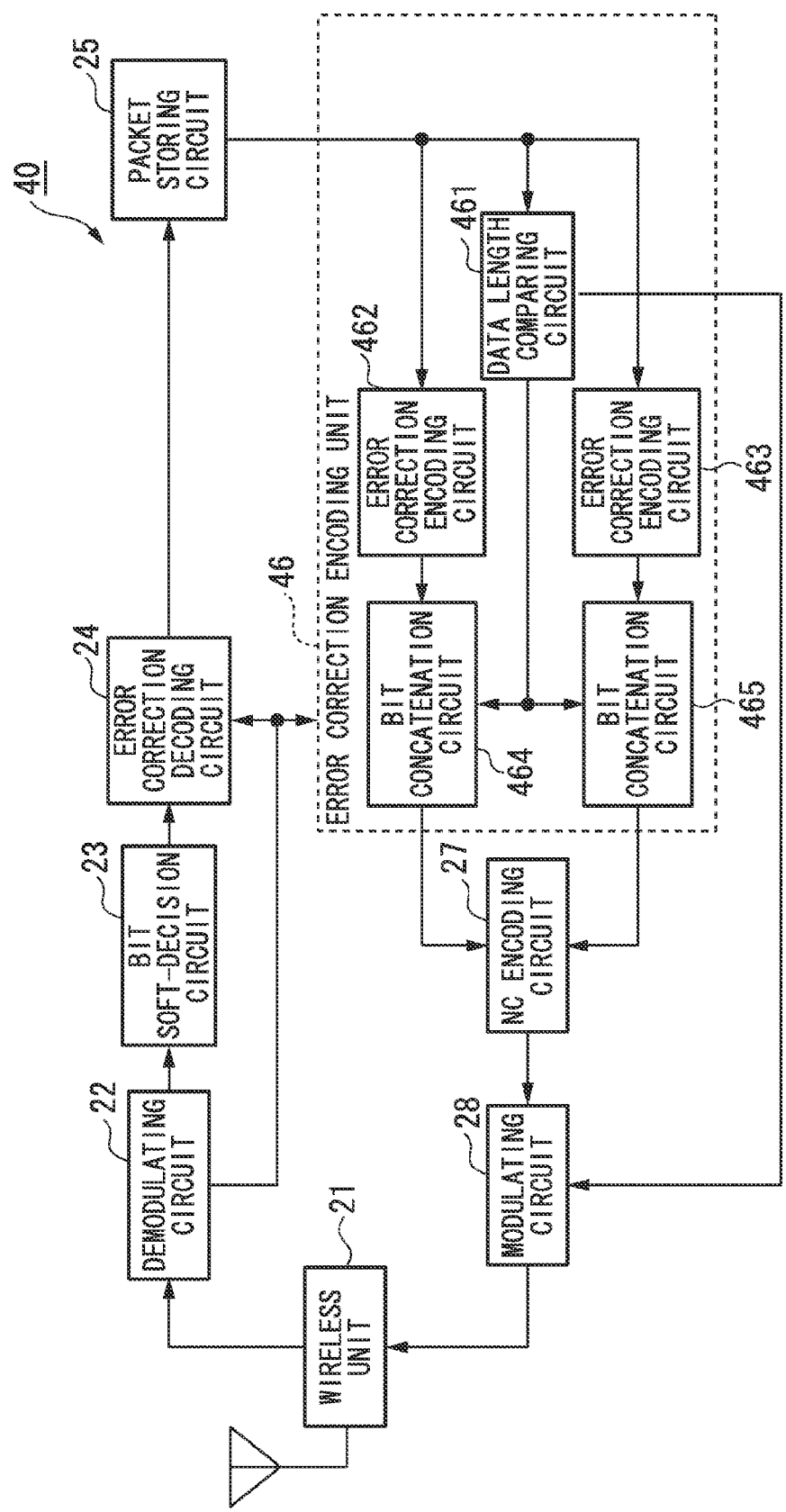
FIG. 5 is a schematic block diagram illustrating the configuration of a wireless relay station apparatus 40 in accordance with the second embodiment.

FIG. 5 is a schematic block diagram illustrating the configuration of the wireless relay station apparatus 40 in accordance with the second embodiment. As illustrated in the figure, the wireless relay station apparatus 40 is provided with a wireless unit 21, a demodulating circuit 22, a bit soft-decision circuit 23, an error correction decoding circuit 24, a packet storing circuit 25, an error correction encoding unit 46, an NC encoding circuit 27, and a modulating circuit 28. The error correction encoding unit 46 includes a data length comparing circuit 461, error correction encoding circuits 462 and 463, and bit concatenation circuits 464 and 465.

It is to be noted that in the wireless relay station apparatus 40, the same reference numerals (21 to 25 and 27 and 28) are used to designate the same components as those of the wireless relay station apparatus 20 of the first embodiment, and a detailed description thereof will be omitted.

The data length comparing circuit 461 reads two packets A and B to be transmitted from the packet storing circuit 25, and calculates data lengths ($D_A=L_A/R_A$ and $D_B=L_B/R_B$) if error correction encoding is performed using coding rates ($R_A$ and $R_B$) required for the two packets. Furthermore, the data length comparing circuit 461 calculates the difference $|D_A-D_B|$ between the data lengths if the error correction encoding is performed, and outputs packet length adjustment information to one of the bit concatenation circuits 464 and 465. The packet length adjustment information is information including an instruction for appending concatenated bit(s) having a data length of $|D_A-D_B|$ to an error correction encoded packet. Furthermore, the concatenated bit(s) are obtained by copying bit(s) included in the error correction encoded packet to which the bit(s) are to be appended.

Furthermore, the data length comparing circuit 461 outputs, to the modulating circuit 28, a packet to which the concatenated bit(s) have been appended and concatenation bit information indicating the data length of the appended concatenation bit(s). The concatenation bit information is incorporated into header information of the packet together with the coding rates of the packet A and the packet B, and is output to the wireless terminal station apparatuses 30.

Similarly to the error correction encoding circuits 262 and 263 of the first embodiment, the error correction encoding circuits 462 and 463 read packets from the packet storing circuit 25, perform error correction encoding using coding rates corresponding to communication quality required for the respective packets, and output error correction encoded packets to the bit concatenation circuits 464 and 465. Here, the coding rates corresponding to the required communication quality are calculated using the state of a transmission path or the like between the station itself and the wireless terminal station apparatuses 30, which are destinations of the packet, or they are values that are predetermined by, for example, the designation from the wireless terminal station apparatuses 30, which are the destinations of the packet, before the error correction encoding circuits 462 and 463 perform error correction encoding.

When the packet length adjustment information is input from the data length comparing circuit 461, the bit concatenation circuit 464 generates concatenation bit(s) having the data length of |D$_A$–D$_B$| based on the input packet length adjustment information, appends the generated concatenation bit(s) to the error correction encoded packet input from the error correction encoding circuit 462, and outputs it to the NC encoding circuit 27. Furthermore, when no packet length adjustment information is input from the data length comparing circuit 461, the bit concatenation circuit 464 outputs the error correction encoded packet input from the error correction encoding circuit 462 to the NC encoding circuit 27.

The bit concatenation circuit 465 has the same configuration as that of the bit concatenation circuit 464, and appends concatenation bit(s) to the error correction encoded packet input from the error correction encoding circuit 463 depending on whether or not the packet length adjustment information is input from the data length comparing circuit 461, and outputs it the NC encoding circuit 27.

Here, a copy source of a concatenation bit is selected as follows. A description will be given of the case in which data lengths after error correction encoding is performed on two packets to be subject to network encoding are set as D$_1$ and D$_2$ (D$_1$<D$_2$), and a bit length of the concatenation bit(s) is set as D$_C$.

When D$_1$≥D$_C$, the copy source bit(s) are selected in accordance with a bit number bn expressed by following Equation 1. That is, in an error correction encoded packet having a shorter data length, copy source bits are selected and copied such that the distance among the copy source bits is the largest and the copy source bits are arranged at uniform intervals.

[Equation 1]

$$b_n = \frac{D_1}{D_C}(n-1) + a \text{ where} \quad (1)$$

$$n = 1, 2, \ldots, D_C \text{ and } 1 \leq a \leq \frac{D_1}{D_C}$$

Here, a may be arbitrarily set within the above range.

Figure 6A:
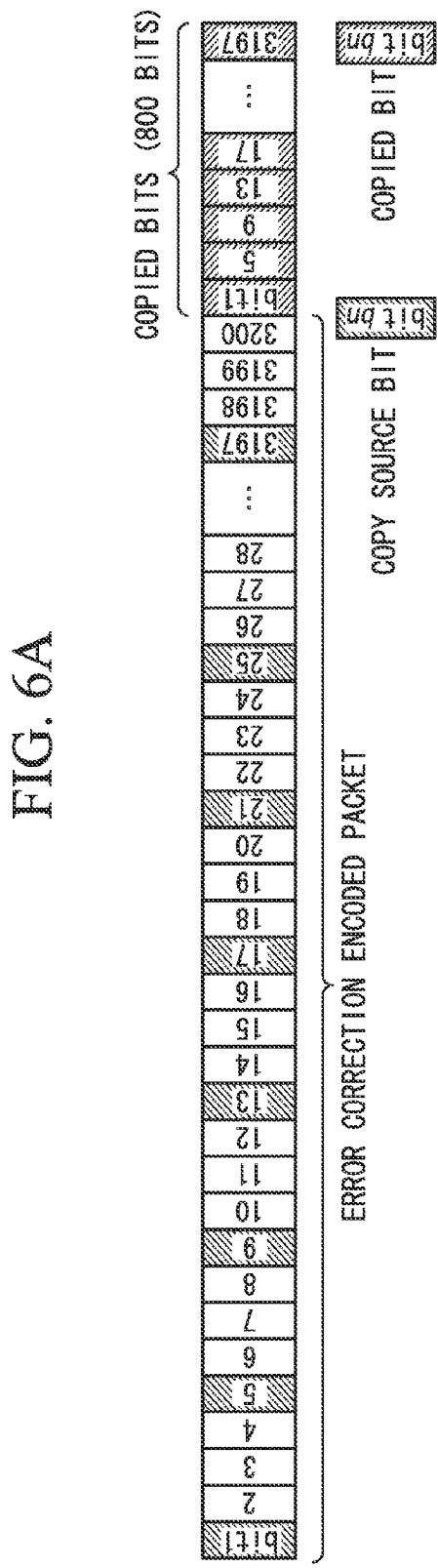
FIG. 6A is a diagram illustrating an example of an arrangement position of concatenated bits in accordance with the above-mentioned embodiment.
Figure 6B:
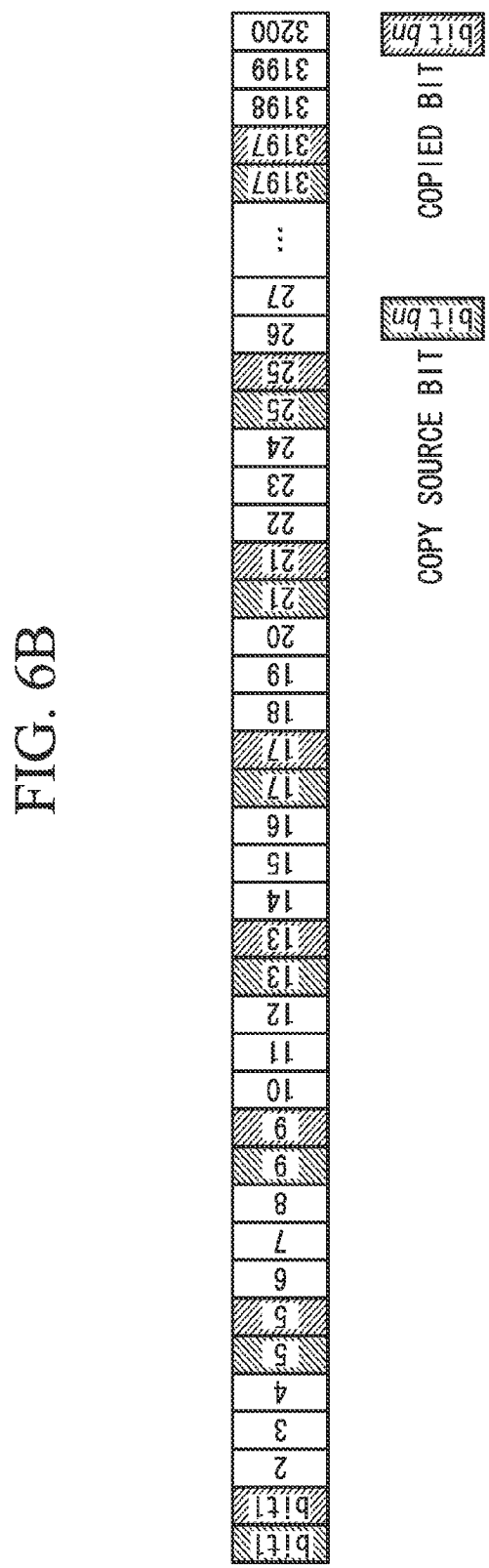
FIG. 6B is a diagram illustrating an example of the arrangement position of concatenated bits in accordance with the above-mentioned embodiment.

FIGS. 6A to 6C are diagrams illustrating examples of arrangement positions (bit sequences after packet length adjustment) of concatenation bits in the present embodiment.

FIG. 6A is an example in which copied bit sequences are gathered and are arranged at an arbitrary position of the original bit sequence. FIG. 6B illustrates an example in which copied bits are arranged such that the position of a copy source bit is closest to the position of a copied bit. FIG. 6C illustrates an example in which copied bits are arranged such that the position of a copy source bit is farthest from the position of a copied bit.

For example, as illustrated in FIG. 6A, when D$_1$ is 3200 bits, D$_2$ is 4000 bits, and D$_C$ is 800 bits, assuming that a=1, a first bit, a fifth bit, a ninth bit, . . . , a 3197$^{th}$ bit are selected as copy sources.

In contrast, when D$_1$<D$_C$ and D$_C$ is an integer multiple of D$_1$, the entirety of an error correction encoded packet is selected as copy source bits and the selected bits are copied (D$_C$/D$_1$) times. Furthermore, when D$_C$ is not an integer multiple of D$_1$, the entirety of an error correction encoded packet is selected as copy source bits, the selected bits are copied by floor (D$_C$/D$_1$), and, for an insufficient portion (a fractional portion), copy source bits are selected and the selected bits are copied similarly to the case in which D$_1$≥D$_C$. Here, the floor (X) is a floor function and indicates the maximum integer which is less than or equal to X with respect to a real number X.

As illustrated in FIG. 6A, an arrangement position of bits obtained by selecting and copying the copy source bits is the end of the error correction encoded packet and all concatenation bits (concatenated copied bits) are appended to the end of the packet. Here, an example is illustrated in which the copied bits are appended to the end of the error correction encoded packet. However, the position at which the copied bits are appended may be any position of the error correction encoded packet; for example, the copied bits may be appended to the head thereof.

As described above, the bit concatenation circuits 464 and 465 select copy source bit(s) from a packet having a shorter data length after error correction encoding, and arrange copied bit(s) (concatenation bit(s)) obtained by copying information of the copy source bit(s) at a predetermined position of the packet. As a result, the data lengths of two error correction encoded packets coincide with each other, and a coding rate is actually reduced to that for the packet having a shorter data length after the error correction encoding.

It is to be noted that the above-mentioned selection technique of the copy source bit(s) and the position at which the copied bit(s) are appended are determined in advance and are shared in advance between the wireless relay station apparatus 40 and the wireless terminal station apparatuses 30.

Furthermore, the position where the copied bit(s) are arranged may be a position adjacent to the copy source bit(s) as illustrated in FIG. 6B. With this arrangement, as compared with FIG. 6A, an input timing of the copied bit(s) is advanced in a soft-combining circuit 393 (which will be described later) of the wireless terminal station apparatuses 30. As a consequence, a waiting time until soft combining starts can be reduced and a process delay relating to error correction decoding can be reduced. It is to be noted that similarly to FIG. 6A, in FIG. 6B, D$_1$ is 3200 bits, D$_2$ is 4000 bits, D$_C$ is 800 bits, and a=1.

Furthermore, as illustrated in FIG. 6C, the position where the copied bit(s) are arranged may be a position such that a constant bit interval is provided between a copy source bit and a copied bit. That is, copied bits may also be arranged at equal intervals on a bit-by-bit basis. For example, the constant bit interval is calculated from a relation between the data length D$_1$ of the error correction encoded packet having a shorter data length and the data length D$_C$ of the concatenated bit(s), for example, floor (D$_1$/D$_C$). Consequently, as compared with the arrangement illustrated in FIG. 6B, it is possible to reduce a correlation between a copy source bit and a copied bit, and to improve a diversity effect by the soft combining in the wireless terminal station apparatuses 30. It is to be noted that similarly to FIG. 6A, in FIG. 6C, D$_1$ is 3200 bits, D$_2$ is 4000 bits, D$_C$ is 800 bits, and a=1. Furthermore, the case in which D$_1$>D$_2$ can be handled by exchanging the above-mentioned D$_1$ and D$_2$ with each other.

Furthermore, an interleaver dedicated to copied bit sequences may also be used to arrange a bit sequence obtained by performing interleaving on the copied bits.

Figure 7:
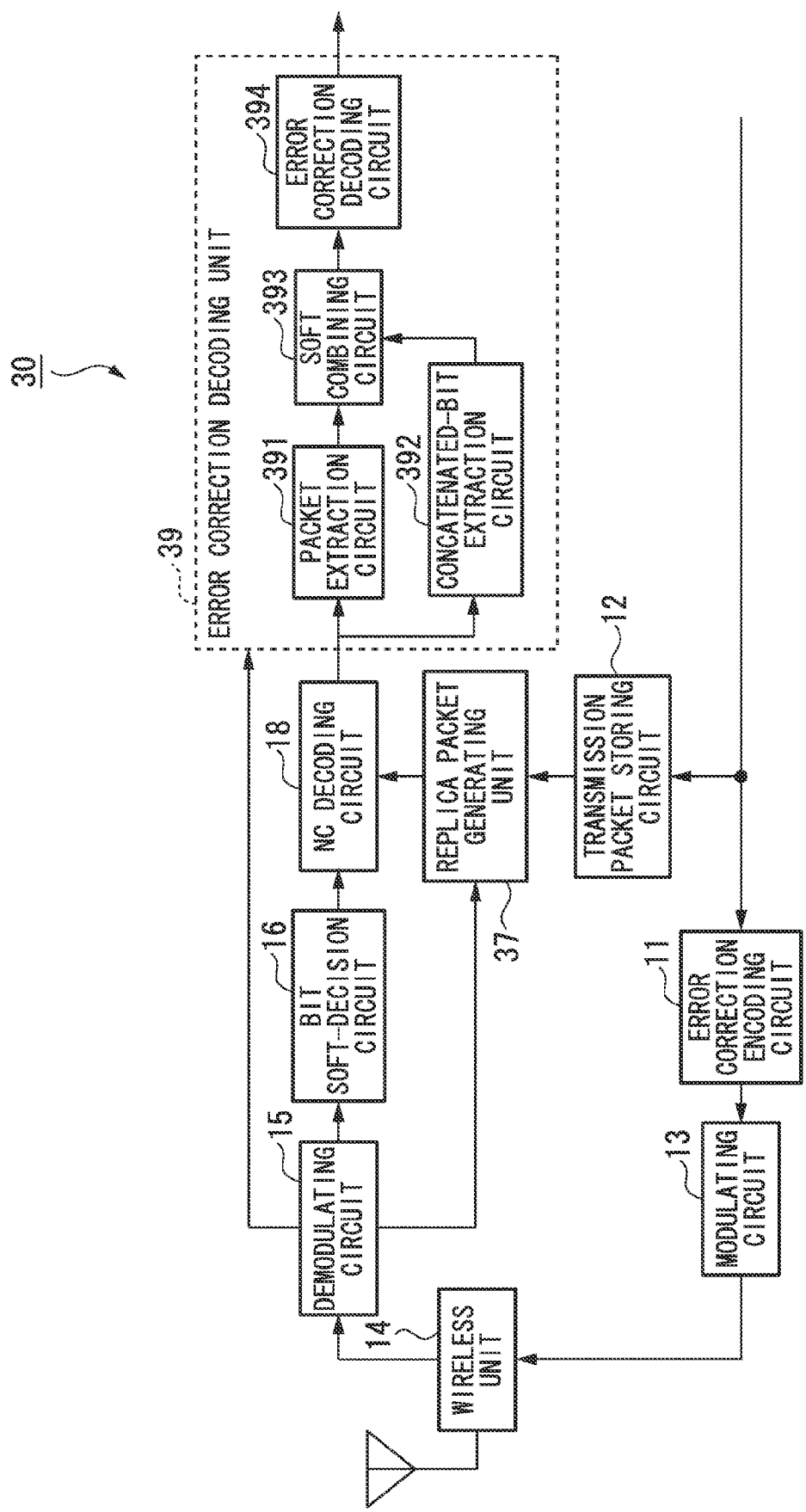
FIG. 7 is a schematic block diagram illustrating the configuration of a wireless terminal station apparatus 30 in accordance with the above-mentioned embodiment.

FIG. 7 is a schematic block diagram illustrating the configuration of the wireless terminal station apparatus 30 in accordance with the present embodiment. As illustrated in the figure, the wireless terminal station apparatus 30 is provided with an error correction encoding circuit 11, a transmission packet storing circuit 12, a modulating circuit 13, a wireless unit 14, a demodulating circuit 15, a bit soft-decision circuit 16, a replica packet generating unit 37, an NC decoding circuit 18, and an error correction decoding unit 39. The error correction decoding unit 39 includes a packet extraction circuit 391, a concatenated bit extraction circuit 392, the soft-combining circuit 393, and an error correction decoding circuit 394.

It is to be noted that in the wireless terminal station apparatus 30, the same reference numerals (11 to 16 and 18) are assigned to the same components as those of the wireless terminal station apparatus 10 (FIG. 2) of the first embodiment, and a detailed description thereof will be omitted.

The replica packet generating unit 37 reads a packet stored in the transmission packet storing circuit 12, and performs error correction encoding on the read packet based on a coding rate included in header information input from the demodulating circuit 15. In addition, the replica packet generating unit 37 generates concatenation bit(s) based on concatenation bit information included in the header information, generates a replica packet by appending the generated concatenation bit(s) to an error correction encoded packet, and outputs the generated replica packet to the NC decoding circuit 18.

The packet extraction circuit 391 deletes the concatenated bit(s) from a packet that has been NC decoded by the NC decoding circuit 18 based on the concatenation bit information included in the header information input by the demodulating circuit 15, and outputs a packet obtained by deleting the concatenated bit(s) to the soft-combining circuit 393.

The concatenated bit extraction circuit 392 extracts the concatenated bit(s) from the packet that has been NC decoded by the NC decoding circuit 18 based on the concatenation bit information included in the header information input by the demodulating circuit 15, and outputs the extracted concatenated bit(s) to the soft-combining circuit 393.

The soft-combining circuit 393 performs soft combining on the packet input from the packet extraction circuit 391 and the concatenated bit(s) input from the concatenated bit extraction circuit 392, and outputs the result of the soft combining to the error correction decoding circuit 394. Here, according to the soft combining, a concatenation bit, which is expressed using a soft-decision value, and a bit serving as a copy source of the concatenation bit are added to each other.

The error correction decoding circuit 394 performs error correction decoding on a packet input from the soft-combining circuit 393 based on the coding rate included in the header information input from the demodulating circuit 15, and outputs a decoded packet.

Figure 8:
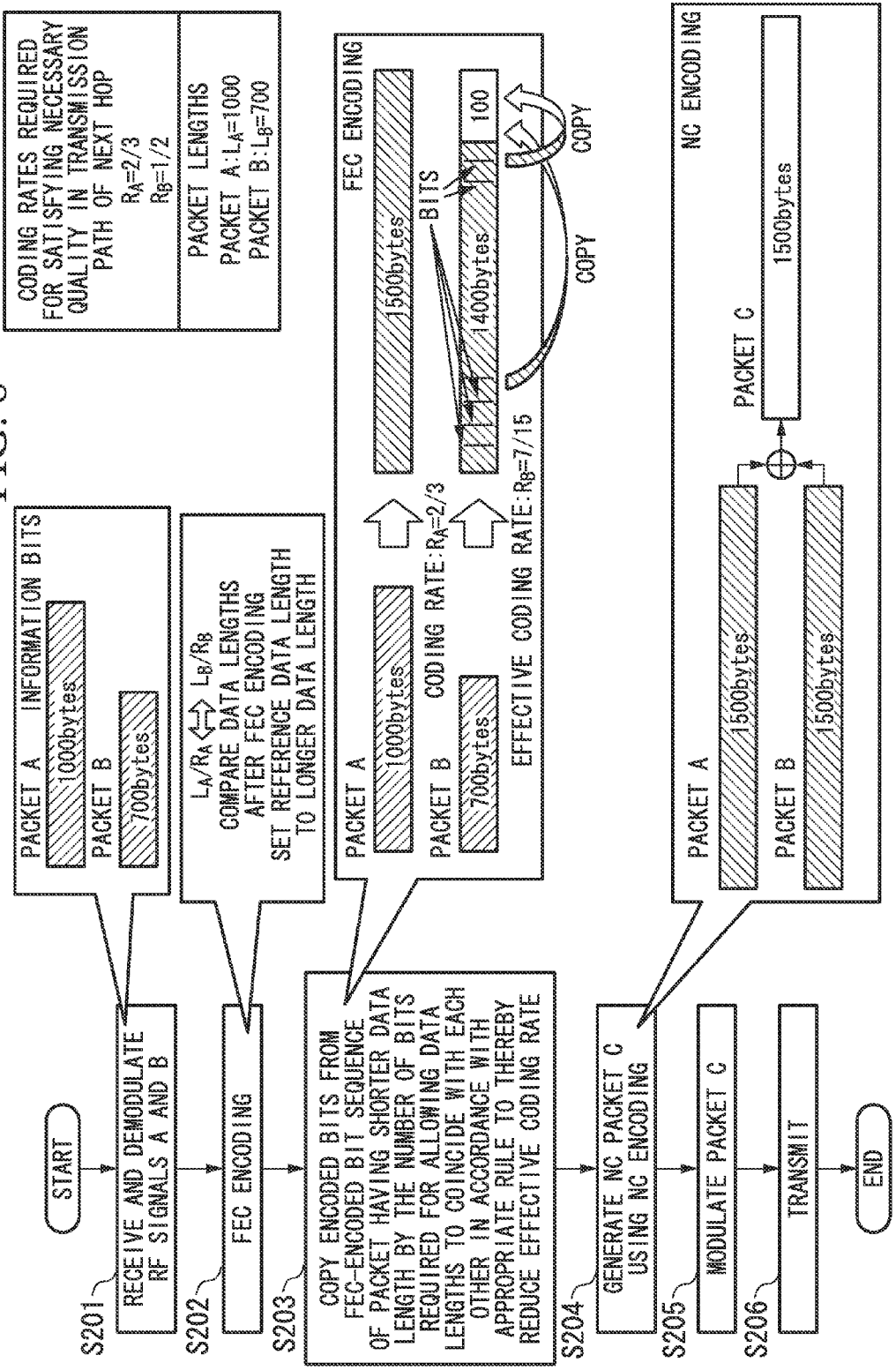
FIG. 8 is a flowchart illustrating the operation of a wireless relay station apparatus 40 in accordance with the above-mentioned embodiment.

Next, the operation of the wireless communication system 200 in accordance with the present embodiment will be described with reference to FIG. 1 and FIG. 8. FIG. 8 is a flowchart illustrating the operation of the wireless relay station apparatus 40 in accordance with the present embodiment. Hereinafter, a description will be given of the case in which the packet lengths $L_A$ and $L_B$ and the coding rates $R_A$ and $R_B$ are as follows. The packet length $L_A$ of the packet A transmitted from the wireless terminal station apparatus 30$a$ to the wireless terminal station apparatus 30$b$ is set to 1000 bytes and the coding rate $R_A$ required for satisfying communication quality necessary for a transmission path of a hop (transmission) from the wireless relay station apparatus 40 to the wireless terminal station apparatus 30$b$ is set to 2/3. Furthermore, the packet length $L_B$ of the packet B transmitted from the wireless terminal station apparatus 30$b$ to the wireless terminal station apparatus 30$a$ is set to 700 bytes and the coding rate $R_B$ required for satisfying communication quality necessary for a transmission path of a hop from the wireless relay station apparatus 40 to the wireless terminal station apparatus 30$a$ is set to 1/2.

At the time T1, in the wireless terminal station apparatus 30$a$ (Node 1), a packet A to be transmitted is input to the error correction encoding circuit 11 and the transmission packet storing circuit 12. The error correction encoding circuit 11 performs error correction encoding on the input packet A and outputs an error correction encoded packet A to the modulating circuit 13. The transmission packet storing circuit 12 stores the input packet A.

The modulating circuit 13 modulates the error correction encoded packet A and converts it into a modulation symbol A. The wireless unit 14 up-converts the modulation symbol A converted by the modulating circuit 13 into an RF signal A, and transmits the generated RF signal A to the wireless relay station apparatus 40 through the antenna.

In the wireless relay station apparatus 40 (Node 2), the wireless unit 21 receives the RF signal A through the antenna, and down-converts the received RF signal A into a modulation symbol A. The demodulating circuit 22 outputs a signal obtained by demodulating the modulation symbol A converted by the wireless unit 21 to the bit soft-decision circuit 23. The bit soft-decision circuit 23 performs soft decision on the input signal of the packet A, and generates a soft-decision signal of the packet A. The error correction decoding circuit 24 stores a packet A which is obtained by performing error correction decoding on the soft-decision signal of the packet A generated by the bit soft-decision circuit 23, in the packet storing circuit 25.

At the time T2, in the wireless terminal station apparatus 30$b$ (Node 3), a packet B to be transmitted is input to the error correction encoding circuit 11 and the transmission packet storing circuit 12. The wireless terminal station apparatus 30$b$ converts the packet B into an RF signal B and outputs the converted RF signal B to the wireless relay station apparatus 40 in the same manner as the wireless terminal station apparatus 30$a$.

In the wireless relay station apparatus 40, the wireless unit 21 receives the RF signal B through the antenna, and similarly to the RF signal A, a packet B which is obtained through demodulation and error correction decoding, is stored in the packet storing circuit 25 (step S201).

At the time T3, in the wireless relay station apparatus 40, the data length comparing circuit 461 reads the packets A and B from the packet storing circuit 25, and calculates a data length $D_A$ (=$L_A/R_A$=1500 bytes) after error correction encoding is performed on the read packet A using the coding rate $R_A$ (=2/3) required for the packet A, and calculates a data length $D_B$ (=$L_B/R_B$=1400 bytes) after error correction encoding is performed on the read packet B using the coding rate $R_B$ (=1/2) required for the packet B.

Then, the data length comparing circuit 461 calculates the difference between the calculated data lengths $D_A$ and $D_B$, and outputs packet length adjustment information to the bit concatenation circuit 465. At this time, the packet length adjustment information includes information indicating the difference (100 bytes) between the data lengths of the packets A and B after the error correction encoding, and an instruction for appending concatenation bits having a data length corresponding to the difference to an error correction encoded packet B.

The error correction encoding circuit 462 performs error correction encoding on the packet A which has been read from the packet storing circuit 25 using the coding rate $R_A$ required for the packet A, and outputs an error correction encoded packet A to the bit concatenation circuit 464. The error correction encoding circuit 463 performs error correction encoding on the packet B which has been read from the packet storing circuit 25 using the coding rate $R_B$ required for the packet B, and outputs the error correction encoded packet B to the bit concatenation circuit 465.

The bit concatenation circuit 464 outputs the error correction encoded packet A input from the error correction encoding circuit 462 to the NC encoding circuit 27. The bit concatenation circuit 465 generates concatenation bits having a length of 100 bytes from the error correction encoded packet B (data length $D_B$=1400 bytes) in accordance with a bit concatenation instruction signal input from the data length comparing circuit 461. In addition, the bit concatenation circuit 465 generates an error correction encoded packet B' (data length $D_B'$=1500 bytes), which is obtained by appending the generated concatenation bits to the error correction encoded packet B, and outputs the generated packet B' to the NC encoding circuit 27 (step S203).

The NC encoding circuit 27 performs NC encoding on the error correction encoded packets A and B' to generate an NC packet C (step S204). The modulating circuit 28 modulates the NC packet C generated by the NC encoding circuit 27 and converts it into a modulation packet C (step S205). The wireless unit 21 up-converts the modulation packet C converted by the modulating circuit 28 into an RF signal C, and transmits the converted RF signal C to the wireless terminal station apparatuses 30a and 30b through the antenna (step S206).

In the wireless terminal station apparatus 30a, the wireless unit 14 down-converts the received RF signal C into a modulation packet C. The demodulating circuit 15 demodulates the modulation packet C converted by the wireless unit 14 to generate a signal of an NC packet C, outputs it to the bit soft-decision circuit 16, outputs header information of the modulation packet C and a data length of the NC packet C to the replica packet generating unit 37, and also outputs the header information to the error correction decoding circuit 39.

The bit soft-decision circuit 16 performs soft decision on the input signal of the NC packet C, and outputs a soft-decision signal of the NC packet C to the NC decoding circuit 18.

The replica packet generating unit 37 reads the packet A (a data length $L_A$=1000 bytes) from the transmission packet storing circuit 12, and performs error correction encoding on the read packet A using the coding rate $R_A$ (=2/3) of the packet A included in the input header information. Furthermore, the replica packet generating unit 37 calculates the data length $D_A$ (=1000/(2/3)=1500 bytes) of the error correction encoded packet A.

Then, the replica packet generating unit 37 compares the data length $D_A$ of the error correction encoded packet A with the data length $D_C$ (=1500 bytes) of the input NC packet C, determines that a data length $D_A$ is equal to the data length $D_C$, and outputs the error correction encoded packet A to the NC decoding circuit 18.

The NC decoding circuit 18 performs NC decoding on the soft-decision signal of the NC packet C input from the bit soft-decision circuit 16 using the error correction encoded packet A input from the replica packet generating unit 37 to calculate an error correction encoded packet B', and outputs the error correction encoded packet B' to the packet extraction circuit 391 and the concatenated bit extraction circuit 392.

The packet extraction circuit 391 deletes the concatenated bits included in the error correction encoded packet B', and outputs an error correction encoded packet B to the soft combining circuit 393. The concatenated bit extraction circuit 392 extracts the concatenated bits included in the error correction encoded packet B', and outputs the extracted concatenated bits to the soft combining circuit 393.

The soft combining circuit 393 combines the input concatenated bits with copy source bits included in the error correction encoded packet B in accordance with a concatenated bit selection rule, and outputs the obtained error correction encoded packet B to the error correction decoding circuit 394. The error correction decoding circuit 394 calculates a packet B by performing error correction decoding on the error correction encoded packet B input from the soft combining circuit 393, and outputs the calculated packet B to an upper layer or the like.

In the wireless terminal station apparatus 30b, the wireless unit 14 down-converts the received RF signal C into a modulation symbol C. The demodulating circuit 15 demodulates the input modulation packet C, and outputs a demodulated modulation symbol C to the bit soft-decision circuit 16. Furthermore, the demodulating circuit 15 outputs header information of the modulation packet C and a data length ($D_C$=1500 bytes) of an NC packet C to the replica packet generating unit 37, and also outputs the header information to the error correction decoding unit 39.

The replica packet generating unit 37 performs error correction encoding on the packet B read from the transmission packet storing circuit 12 using the coding rate $R_B$ (=1/2) of the error correction encoded packet B included in the input header information, and calculates a data length $D_B$ (=700/(1/2)=1400 bytes) of the error correction encoded packet B. Then, the replica packet generating unit 37 compares the data length $D_C$ (=1500 bytes) of the input NC packet C with the calculated data length $D_B$ (=1400 bytes) of the error correction encoded packet B. When it is determined that the data length $D_B$ of the error correction encoded packet B is shorter than the data length $D_C$ of the NC packet C, the replica packet generating unit 37 appends ($|D_C - D_B| \times 8$) concatenation bits to the error correction encoded packet B, and outputs an error correction encoded packet B' having a data length of 1500 bytes to the NC decoding circuit 18.

The NC decoding circuit 18 calculates an error correction encoded packet A by performing NC decoding on the input NC packet C using the input error correction encoded packet B', and outputs the calculated error correction encoded packet A to the packet extraction circuit 391 and the concatenated bit extraction circuit 392. The packet extraction circuit 391 outputs the input error correction encoded packet A to the soft combining circuit 393 in accordance with a concatenation bit length (zero) input from the demodulating circuit 15. The concatenated bit extraction circuit 392 outputs information indicating the absence of the appended concatenation bits to the soft combining circuit 393 in accordance with the concatenation bit length (zero) of the packet A included in the header information input from the demodulating circuit 15.

The soft combining circuit 393 outputs the input error correction encoded packet A to the error correction decoding circuit 394 without performing any combining; that is, the soft combining circuit 393 outputs the input error correction encoded packet A to the error correction decoding circuit 394. The error correction decoding circuit 394 calculates a packet A by performing error correction decoding on the error correction encoded packet A input from the soft combining circuit 393, and outputs the calculated packet A to an upper layer or the like.

As described above, the wireless communication system 200 performs the transmission of the packet A and the packet B. In the wireless relay station apparatus 40, the error correction encoding unit 46 performs error correction encoding on the packet A and the packet B, before the NC encoding circuit 27 performs NC encoding on the packet A and the packet B. Consequently, it is possible to apply different coding rates to the packet A and the packet B, to suppress an increase in the data length of a packet to be transmitted as illustrated in FIG. 9B, and to overcome inefficiency.

Furthermore, in the wireless relay station apparatus 40, when there is a difference between the data lengths if the error correction encoding is performed on the packet A and the packet B using the coding rates required for the packet A and the packet B, the bit concatenation circuits 464 and 465 allow the data lengths to coincide with each other by appending concatenation bit(s), which are obtained by copying bits included in an error correction encoded packet, to the error correction encoded packet. Then, in the wireless terminal station apparatuses 30a and 30b, the error correction decoding unit 39 obtains a diversity effect by performing soft combining using the appended concatenated bits, resulting in improvement of the reliability of the error correction encoded packet to which the concatenated bit(s) have been appended.

Furthermore, when selectable coding rates are limited in the wireless terminal station apparatuses 30 and the wireless relay station apparatus 40, it is possible for the wireless communication system 200 of the present embodiment to allow data lengths of packets to be subject to NC encoding to coincide with each other through a simple process for appending concatenation bit(s) after error correction encoding. Consequently, it is effective even when coding rates cannot be freely selectable as with the wireless communication system 100 of the first embodiment.

It is to be noted that in the present embodiment, the bit concatenation circuits 464 and 465 may use selection methods other than the above-mentioned selection method of the copy source bits. For example, when a modulation scheme used in wireless transmission from the wireless relay station apparatus 20 (40) to the wireless terminal station apparatuses 10 (30) is multilevel quadrature modulation of 16 QAM (Quadrature Amplitude Modulation) or more using Gray arrangement, since the error tolerance of the least significant bit in each modulation symbol is reduced, the least significant bit of each modulation symbol is preferentially selected as a copy source bit. Specifically, when the 16 QAM is used, since the error tolerance of the two least significant bits indicating a modulation symbol is low, copy source bits are selected every 2 bits to generate concatenation bits. In addition, when $D_C > D_1/2$, the least significant bit as well as the most significant bit may also be selected as copy source bits, or the least significant bit may also be copied a plurality of times.

Furthermore, when the 64 QAM is used, since the error tolerance of the three least significant bits indicating a modulation symbol is low, copy source bits are selected every 3 bits to generate concatenation bits. In addition, when $D_C > D_1/3$, the least significant bit as well as the most significant bit and an intermediate bit may also be selected as copy source bits, or the least significant bit may also be copied a plurality of times.

Consequently, redundancy is preferentially given to bit(s) with low error tolerance and reliability is enhanced by a diversity effect, so that it is possible to improve error correction performance in the error correction decoding circuit 394.

It is to be noted that in the above-mentioned first and second embodiments, a description has been given of the case in which the network configuration is the Alice-and-Bob topology. However, the network configuration is not limited thereto, and a network configuration such as X topology or chain topology may also be used. In this case, in the wireless terminal station apparatuses 10 (30), and decoding of a network encoded NC packet is performed using a received native packet (a packet not NC encoded) instead of a transmitted packet.

Furthermore, a combination of the above-mentioned first and second embodiments may also be used. In this case, in the first embodiment, the coding rate setting circuit 261 changes a coding rate in accordance with a packet length after error correction encoding. However, when selectable coding rates are limited, a coding rate close to a desired coding rate is selected from among the selectable coding rates, so that data lengths, between which a difference is generated after error correction encoding, are allowed to coincide with each other using concatenation bit(s). Consequently, it is possible to reduce the size of circuits required for error correction encoding and error correction decoding.

It is to be noted that as a method for allowing the data lengths of the packet A and the packet B to coincide with each other, a plurality of packets may be concatenated to the packet A and the packet B, respectively, so that final data lengths after the concatenation coincide with each other. Since packets having various data lengths flow through a network, as a result of the concatenation of the plurality of packets, data lengths of the concatenated packets statistically approach the same data length. Consequently, it is possible to transmit more packets at a time and to obtain an advantageous effect that data lengths of packets to be subject to network encoding are approximately equal to each other, resulting in improvement of system throughput.

Furthermore, data lengths after error correction encoding has been performed on the concatenated packets may be allowed to coincide with each other through a combination of the technique for concatenating a plurality of packets and adjustment of data lengths in accordance with the first embodiment and the second embodiment.

It is to be noted that when Quality of Service (QoS) is considered, data lengths of packets with the same QoS class are approximately equal to each other. Therefore, the wireless relay station apparatus may control the packet storing circuit such that network encoding is performed on the packets with the same QoS class. Consequently, it is possible to allow data lengths of the packets subject to the network encoding to coincide with each other, resulting in improvement of system throughput.

Furthermore, final data lengths may be allowed to coincide with each other through a combination of the control technique of the packet storing circuit based on the QoS and adjustment of data lengths in accordance with the first embodiment and the second embodiment.

While embodiments of the present invention have been described with reference to the drawings, specific configurations are not limited to these embodiments, and designs (additions, omissions, substitutions, and other modifications) can be made without departing from the gist of the present invention. Accordingly, the present invention is not to be considered as being limited by the foregoing description, and is only limited by the scope of the appended claims.

INDUSTRIAL APPLICABILITY

The present invention is applied to, for example, a wireless communication system to which network coding is applied. In accordance with the present invention, it is possible to set transmission quality for each destination of packets and improve the throughput of the wireless communication system.

DESCRIPTION OF REFERENCE SYMBOLS

10, 10a, 10b, 30, 30a, 30b: Wireless terminal station apparatus 11: Error correction encoding circuit
12: Transmission packet storing circuit
13: Modulating circuit
14: Wireless unit
15: Demodulating circuit
16: Bit soft-decision circuit
17, 37: Replica packet generating unit
18: NC decoding circuit
19, 39: Error correction decoding unit
20, 40: Wireless relay station apparatus
21: Wireless unit
22: Demodulating circuit
23: Bit soft-decision circuit
24: Error correction decoding circuit
25: Packet storing circuit
26, 46: Error correction encoding unit
27: NC encoding circuit
28: Modulating circuit
91, 92: Wireless terminal station apparatus
93: Wireless relay station apparatus
100, 200, 300: Wireless communication system
191: Error correction decoding circuit
261: Coding rate setting circuit
262, 263: Error correction encoding circuit
391: Packet extraction circuit
392: Concatenated bit extraction circuit
393: Soft combining circuit
394: Error correction decoding circuit
461: Data length comparing circuit
462, 463: Error correction encoding circuit
464, 465: Bit concatenation circuit

The invention claimed is:

1. A wireless relay station apparatus that transmits a first packet and a second packet to a plurality of wireless terminal station apparatuses, the first packet being different from the second packet, the wireless relay station apparatus comprising:
an error correction encoding unit that selects coding rates to be used for the first packet and the second packet in accordance with communication quality required for the first packet and the second packet, and generates error correction encoded packets having the same data length from the first packet and the second packet using the selected coding rates;
a network encoding circuit that performs network encoding on error correction encoded first and second packets to generate a network encoded packet; and
a transmission circuit that transmits the network encoded packet to the plurality of wireless terminal station apparatuses.

2. The wireless relay station apparatus according to claim 1, wherein the error correction encoding unit calculates packet lengths if error correction encoding is performed using the coding rates required for the first packet and the second packet, reduces a coding rate corresponding to a packet having a shorter calculated packet length, and performs error correction encoding such that the error correction encoded first packet and the error correction encoded second packet have the same packet length.

3. The wireless relay station apparatus according to claim 1, wherein, when there is a difference between data lengths if the error correction encoding is performed on the first packet and the second packet, the error correction encoding unit generates a concatenation bit by copying a bit included in an error correction encoded packet having a shorter data length, appends the concatenation bit to the error correction encoded packet having the shorter data length, and allows the data lengths of the error correction encoded first and second packets to coincide with each other.

4. The wireless relay station apparatus according to claim 3, wherein, when multilevel quadrature modulation is used for wireless transmission from the wireless relay station apparatus to the plurality of wireless terminal station apparatuses, the error correction encoding unit preferentially selects a least significant bit from among bits which constitute a modulation symbol generated by the multilevel quadrature modulation, as a copy source bit of the concatenation bit.

5. The wireless relay station apparatus according to claim 3, wherein the error correction encoding unit collectively arranges concatenation bits at a predetermined position of the error correction encoded packet having the shorter data length.

6. The wireless relay station apparatus according to claim 3, wherein the error correction encoding unit arranges a bit constituting the concatenation bit which is obtained by copying a copy source bit, at a position adjacent to the copy source bit of the bit constituting the concatenation bit.

7. The wireless relay station apparatus according to claim 3, wherein the error correction encoding unit arranges a bit constituting the concatenation bit at a position spaced apart from a copy source bit of the bit constituting the concatenation bit by a constant bit interval.

8. A wireless communication system comprising: a wireless relay station apparatus that transmits a first packet and a second packet to a plurality of wireless terminal station apparatuses, the first packet being different from the second packet,
wherein the wireless relay station apparatus comprises:
an error correction encoding unit that selects coding rates to be used for the first packet and the second packet in accordance with communication quality required for the first packet and the second packet, and generates error correction encoded packets having the same data length from the first packet and the second packet using the selected coding rates;
a network encoding circuit that performs network encoding on error correction encoded first and second packets to generate a network encoded packet; and
a transmission circuit that transmits the network encoded packet to the plurality of wireless terminal station apparatuses, and
among the plurality of wireless terminal station apparatuses, each of a wireless terminal station apparatus which stores a third packet equal to the first packet in a storing circuit and a wireless terminal station apparatus which stores a third packet equal to the second packet in a storing circuit comprises:
an error correction encoding unit that performs error correction encoding on the third packet;
a network decoding circuit that performs network decoding on the network encoded packet that has been received using an error correction encoded third packet to generate a decoded packet; and
an error correction decoding unit that performs error correction decoding on the decoded packet.

9. The wireless communication system according to claim 8, wherein the error correction encoding unit calculates packet lengths if error correction encoding is performed using the coding rates required for the first packet and the second packet, reduces a coding rate corresponding to a packet having a shorter calculated packet length, and performs error correction encoding such that the error correction encoded first packet and the error correction encoded second packet have the same packet length.

10. The wireless communication system according to claim 8, wherein, when there is a difference between data lengths if error correction encoding is performed on the first packet and the second packet, the error correction encoding unit generates a concatenation bit by copying a bit included in an error correction encoded packet having a shorter data length, appends the concatenation bit to the error correction encoded packet having the shorter data length, and allows the data lengths of the error correction encoded first and second packets to coincide with each other, and the error correction decoding unit extracts the error correction encoded packet having the shorter data length and the concatenation bit from the decoded packet, and performs error correction decoding by performing soft combining on the error correction encoded packet having the shorter data length and the concatenation bit.

11. The wireless communication system according to claim 10, wherein, when multilevel quadrature modulation is used for wireless transmission from the wireless relay station apparatus to the plurality of wireless terminal station apparatuses, the error correction encoding unit preferentially selects a least significant bit from among bits which constitute a modulation symbol generated by the multilevel quadrature modulation, as a copy source bit of the concatenation bit.

12. The wireless communication system according to claim 10, wherein the error correction encoding unit collectively arranges concatenation bits at a predetermined position of the error correction encoded packet having the shorter data length.

13. The wireless communication system according to claim 10, wherein the error correction encoding unit arranges a bit constituting the concatenation bit which is obtained by copying a copy source bit, at a position adjacent to the copy source bit of the bit constituting the concatenation bit.

14. The wireless communication system according to claim 10, wherein the error correction encoding unit arranges a bit constituting the concatenation bit at a position spaced apart from a copy source bit of the bit constituting the concatenation bit by a constant bit interval.

15. A wireless terminal station apparatus in a wireless communication system provided with a wireless relay station apparatus that transmits a first packet and a second packet to a plurality of wireless terminal station apparatuses, the first packet being different from the second packet, the wireless terminal station apparatus comprising:

a reception circuit that receives a network encoded packet, the network encoded packet being generated such that the wireless relay station apparatus selects coding rates to be used for the first packet and the second packet in accordance with communication quality required for the first packet and the second packet, generates error correction encoded packets having the same data length from the first packet and the second packet using the selected coding rates, and performs network encoding on error correction encoded first and second packets to generate the network encoded packet;

a storing circuit that stores a third packet equal to one of the first packet and the second packet;

an error correction encoding unit that performs error correction encoding on the third packet;

a network decoding circuit that performs network decoding on the network encoded packet that has been received using an error correction encoded third packet to generate a decoded packet; and an error correction decoding unit that performs error correction decoding on the decoded packet.

16. A wireless communication method in a wireless communication system provided with a wireless relay station apparatus that transmits a first packet and a second packet to a plurality of wireless terminal station apparatuses, the first packet being different from the second packet, the wireless communication method comprising:

a step of, by an error correction encoding unit of the wireless relay station apparatus, selecting coding rates to be used for the first packet and the second packet in accordance with communication quality required for the first packet and the second packet, and generating error correction encoded packets having the same data length from the first packet and the second packet using the selected coding rates;

a step of, by a network encoding circuit of the wireless relay station apparatus, performing network encoding on error correction encoded first and second packets to generate a network encoded packet;

a step of, by a transmission circuit of the wireless relay station apparatus, transmitting the network encoded packet to the plurality of wireless terminal station apparatuses;

a step of, by an error correction encoding unit of a wireless terminal station apparatus which stores a third packet equal to the first packet in a storing circuit among the plurality of wireless terminal station apparatuses, performing error correction encoding on the stored third packet;

a step of, by an error correction encoding unit of a wireless terminal station apparatus which stores a third packet equal to the second packet in a storing circuit among the plurality of wireless terminal station apparatuses, performing error correction encoding on the stored third packet;

a step of, by network decoding circuits of the plurality of wireless terminal station apparatuses, performing network decoding on the network encoded packet that has been received using the error correction encoded third packet to generate a decoded packet; and a step of, by error correction decoding units of the plurality of wireless terminal station apparatuses, performing error correction decoding on the decoded packet.

\* \* \* \* \*